United States Patent
Kucera et al.

(10) Patent No.: US 10,203,049 B2
(45) Date of Patent: *Feb. 12, 2019

(54) GAS VALVE WITH ELECTRONIC HEALTH MONITORING

(71) Applicant: Honeywell International Inc., Morris Plaines, NJ (US)

(72) Inventors: David Kucera, Bilovice nad Svitavou (CZ); Timothy McCarthy, Maple Grove, MN (US); Gregory Young, Richfield, MN (US); Donald J. Kasprzyk, Maple Grove, MN (US); Jos Praat, Drenthe (NL); Carl Manoogian, Farmington Hills, MI (US); Patrick Yuen, Markham (CA)

(73) Assignee: Honeywell International Inc., Morris Plaines, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/479,114

(22) Filed: Apr. 4, 2017

(65) Prior Publication Data

US 2017/0204990 A1 Jul. 20, 2017

Related U.S. Application Data

(63) Continuation of application No. 14/489,068, filed on Sep. 17, 2014, now Pat. No. 9,645,584.

(51) Int. Cl.
*F16K 37/00* (2006.01)
*F16K 17/36* (2006.01)
(Continued)

(52) U.S. Cl.
CPC .......... *F16K 37/0041* (2013.01); *F16K 17/36* (2013.01); *F16K 37/0083* (2013.01);
(Continued)

(58) Field of Classification Search
CPC ......... Y10T 137/0379; Y10T 137/7761; Y10T 137/7759; Y10T 137/8175;
(Continued)

(56) References Cited

U.S. PATENT DOCUMENTS 156,769 A 11/1874 Cameron
424,581 A 4/1890 Sickels
(Continued)

FOREIGN PATENT DOCUMENTS

DE 3638604 A1 5/1988
DE 19617852 A1 10/1997
(Continued)

OTHER PUBLICATIONS

Office Action for EP Application No. 14194824.0 dated Jun. 23, 2017.
(Continued)

*Primary Examiner* — Atif Chaudry
(74) *Attorney, Agent, or Firm* — Seager, Tufte & Wickhem LLP

(57) ABSTRACT

This disclosure relates generally to valves, and more particularly, to gas valve assemblies. In one illustrative but non-limiting example, a valve assembly may include a valve body, a valve situated in a fluid path of the valve body, a valve actuator for selectively moving the valve actuator, one or more sensors in communication with the fluid path, a controller secured relative to the valve body and in communication with the sensors, and memory operatively coupled to the controller. A user interface may be in communication with the memory and the controller and may be configured to receive a selection from a user for selecting one of two or more selectable options from the memory. The controller may compare sensed parameters to threshold values associated with the selected option. The user interface (Continued)

may have a lock on it to prevent tampering and to provide accountability.

20 Claims, 17 Drawing Sheets

(51) Int. Cl.
  *G05D 7/06* (2006.01)
  *G05D 16/20* (2006.01)
  *F23N 1/00* (2006.01)

(52) U.S. Cl.
  CPC .......... *F16K 37/0091* (2013.01); *F23N 1/002* (2013.01); *G05D 7/0635* (2013.01); *G05D 7/0647* (2013.01); *G05D 16/202* (2013.01); *F23N 2035/14* (2013.01); *F23N 2035/18* (2013.01); *Y10T 137/0379* (2015.04); *Y10T 137/7759* (2015.04); *Y10T 137/7761* (2015.04); *Y10T 137/8175* (2015.04)

(58) Field of Classification Search
  CPC ............ Y10T 137/0452; G05D 16/202; G05D 7/0647; F16K 37/0083; F16K 37/0091; F16K 37/0041
  See application file for complete search history.

(56) References Cited

U.S. PATENT DOCUMENTS

| | | |
|---|---|---|
| 1,033,204 A | 7/1912 | Skinner |
| 1,147,840 A | 7/1915 | Bowser |
| 1,156,977 A | 10/1915 | Cloos |
| 1,165,315 A | 12/1915 | Cameron |
| 1,206,532 A | 11/1916 | Gray |
| 1,847,385 A | 3/1932 | Dengler |
| 2,093,122 A | 9/1937 | Andrews |
| 2,196,798 A | 4/1940 | Horstmann |
| 2,403,692 A | 7/1946 | Tibbetts |
| 2,440,329 A | 4/1948 | Doble |
| 2,497,549 A | 2/1950 | Heller |
| 2,561,793 A | 7/1951 | Furczyk |
| 2,791,238 A | 5/1957 | Bryant |
| 2,975,307 A | 3/1961 | Schroeder et al. |
| 3,164,364 A | 1/1965 | McColl |
| 3,202,170 A | 8/1965 | Holbrook |
| 3,304,406 A | 2/1967 | King |
| 3,346,008 A | 10/1967 | Scaramucci |
| 3,381,623 A | 5/1968 | Elliott |
| 3,393,965 A | 7/1968 | Vaughan |
| 3,414,010 A | 12/1968 | Sparrow |
| 3,493,005 A | 2/1970 | Kakegawa |
| 3,641,373 A | 2/1972 | Elkuch |
| 3,646,969 A | 3/1972 | Stampfli |
| 3,744,754 A | 7/1973 | Demi |
| 3,769,531 A | 10/1973 | Elkuch |
| 3,803,424 A | 4/1974 | Smiley et al. |
| 3,884,266 A | 5/1975 | Kondo |
| 3,947,644 A | 3/1976 | Uchikawa |
| 3,960,364 A | 6/1976 | Hargrave |
| 3,973,576 A | 8/1976 | Dietiker et al. |
| 3,973,976 A | 8/1976 | Boyd |
| 3,993,939 A | 11/1976 | Slavin et al. |
| 4,114,652 A | 9/1978 | Oberle |
| 4,115,036 A | 9/1978 | Paterson |
| 4,140,936 A | 2/1979 | Bullock |
| 4,188,013 A | 2/1980 | Battersby et al. |
| 4,188,972 A | 2/1980 | Van Der Zee |
| 4,197,737 A | 4/1980 | Pittman |
| 4,242,080 A | 12/1980 | Tabei |
| 4,277,832 A | 7/1981 | Wong |
| 4,360,955 A | 11/1982 | Block |
| 4,402,340 A | 9/1983 | Lockwood, Jr. |
| 4,406,131 A | 9/1983 | Weasel, Jr. |
| 4,418,886 A | 12/1983 | Holzer |
| 4,442,853 A | 4/1984 | Gort |
| 4,450,868 A | 5/1984 | Duval et al. |
| 4,453,169 A | 6/1984 | Martner |
| 4,478,076 A | 10/1984 | Bohrer |
| 4,478,077 A | 10/1984 | Bohrer et al. |
| 4,481,776 A | 11/1984 | Araki et al. |
| 4,493,303 A | 1/1985 | Thompson et al. |
| 4,498,850 A | 2/1985 | Perlov et al. |
| 4,498,863 A | 2/1985 | Hanson et al. |
| 4,501,144 A | 2/1985 | Higashi et al. |
| 4,539,575 A | 9/1985 | Nilsson |
| 4,543,974 A | 10/1985 | Dietiker et al. |
| 4,576,050 A | 3/1986 | Lambert |
| 4,581,624 A | 4/1986 | O'Connor |
| 4,581,707 A | 4/1986 | Millar |
| 4,585,209 A | 4/1986 | Aine et al. |
| 4,619,438 A | 10/1986 | Coffee |
| 4,622,699 A | 11/1986 | Spriggs |
| 4,622,999 A | 11/1986 | Ray |
| 4,645,450 A | 2/1987 | West |
| 4,651,564 A | 3/1987 | Johnson et al. |
| 4,654,546 A | 3/1987 | Kirjavainen |
| 4,722,360 A | 2/1988 | Odajima et al. |
| 4,756,508 A | 7/1988 | Giachino et al. |
| 4,798,531 A | 1/1989 | Breckner |
| 4,815,699 A | 3/1989 | Mueller |
| 4,821,999 A | 4/1989 | Ohtaka |
| 4,829,826 A | 5/1989 | Valentin et al. |
| 4,835,717 A | 5/1989 | Michel et al. |
| 4,836,247 A | 6/1989 | Chuang |
| 4,898,200 A | 2/1990 | Odajima et al. |
| 4,911,616 A | 3/1990 | Laumann, Jr. |
| 4,915,613 A | 4/1990 | Landis |
| 4,938,742 A | 7/1990 | Smits |
| 4,939,405 A | 7/1990 | Okuyama et al. |
| 5,022,435 A | 6/1991 | Jaw-Shiunn |
| 5,065,978 A | 11/1991 | Albarda et al. |
| 5,069,419 A | 12/1991 | Jerman |
| 5,070,252 A | 12/1991 | Castenschiold et al. |
| 5,078,581 A | 1/1992 | Blum et al. |
| 5,082,242 A | 1/1992 | Bonne et al. |
| 5,082,246 A | 1/1992 | Stanley et al. |
| 5,085,562 A | 2/1992 | Van Lintel |
| 5,096,388 A | 3/1992 | Weinberg |
| 5,129,794 A | 7/1992 | Beattty |
| 5,146,941 A | 9/1992 | Statler |
| 5,148,074 A | 9/1992 | Fujita et al. |
| 5,169,063 A | 12/1992 | Miyazaki et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Ohnstein |
| 5,186,054 A | 2/1993 | Sekimura |
| 5,190,068 A | 3/1993 | Philbin |
| 5,192,197 A | 3/1993 | Culp |
| 5,193,993 A | 3/1993 | Dietiker |
| 5,199,456 A | 4/1993 | Love et al. |
| 5,199,462 A | 4/1993 | Baker |
| 5,203,688 A | 4/1993 | Dietiker |
| 5,205,323 A | 4/1993 | Baker |
| 5,206,557 A | 4/1993 | Bobbio |
| 5,215,112 A | 6/1993 | Davison |
| 5,215,115 A | 6/1993 | Dietiker |
| 5,219,278 A | 6/1993 | van Lintel |
| 5,224,843 A | 7/1993 | Van Lintel |
| 5,244,527 A | 9/1993 | Aoyagi |
| 5,244,537 A | 9/1993 | Ohnstein |
| 5,263,514 A | 11/1993 | Reeves |
| 5,294,089 A | 3/1994 | LaMarca |
| 5,317,670 A | 5/1994 | Elia |
| 5,322,258 A | 6/1994 | Bosch et al. |
| 5,323,999 A | 6/1994 | Bonne |
| 5,325,880 A | 7/1994 | Johnson et al. |
| 5,336,062 A | 8/1994 | Richter |
| 5,368,571 A | 11/1994 | Horres, Jr. |
| 5,388,607 A | 2/1995 | Ramaker et al. |
| 5,441,597 A | 8/1995 | Bonne et al. |
| 5,449,142 A | 9/1995 | Banick |

(56) References Cited

U.S. PATENT DOCUMENTS

| | | |
|---|---|---|
| 5,452,878 A | 9/1995 | Gravesen et al. |
| 5,460,196 A | 10/1995 | Yonnet |
| 5,477,877 A | 12/1995 | Schulze et al. |
| 5,499,909 A | 3/1996 | Yamada et al. |
| 5,513,611 A | 5/1996 | Ricouard et al. |
| 5,520,533 A | 5/1996 | Vrolijk |
| 5,526,172 A | 6/1996 | Kanack |
| 5,529,465 A | 6/1996 | Lengerle et al. |
| 5,536,963 A | 7/1996 | Polla |
| 5,538,220 A | 7/1996 | LaMarca |
| 5,541,465 A | 7/1996 | Higuchi et al. |
| 5,552,654 A | 9/1996 | Konno et al. |
| 5,565,832 A | 10/1996 | Haller et al. |
| 5,571,401 A | 11/1996 | Lewis et al. |
| 5,580,444 A | 12/1996 | Burrows |
| 5,590,235 A | 12/1996 | Rappenecker et al. |
| 5,621,164 A | 4/1997 | Woodbury et al. |
| 5,642,015 A | 6/1997 | Whitehead et al. |
| 5,662,465 A | 9/1997 | Kano |
| 5,676,342 A | 10/1997 | Otto et al. |
| 5,683,159 A | 11/1997 | Johnson |
| 5,685,707 A | 11/1997 | Ramsdell et al. |
| 5,696,662 A | 12/1997 | Bauhahn |
| 5,725,363 A | 3/1998 | Bustgens et al. |
| 5,735,503 A | 4/1998 | Hietkamp |
| 5,741,978 A | 4/1998 | Gudmundsson |
| 5,748,432 A | 5/1998 | Przywozny et al. |
| 5,755,259 A | 5/1998 | Schulze et al. |
| 5,759,014 A | 6/1998 | Van Lintel |
| 5,759,015 A | 6/1998 | Van Lintel et al. |
| 5,769,043 A | 6/1998 | Nitikiewicz |
| 5,774,372 A | 6/1998 | Berwanger |
| 5,790,420 A | 8/1998 | Lang |
| 5,792,957 A | 8/1998 | Luder et al. |
| 5,797,358 A | 8/1998 | Brandt et al. |
| 5,808,205 A | 9/1998 | Romo |
| 5,822,170 A | 10/1998 | Cabuz et al. |
| 5,827,950 A | 10/1998 | Woodbury et al. |
| 5,836,750 A | 11/1998 | Cabuz |
| 5,839,467 A | 11/1998 | Saaski et al. |
| 5,847,523 A | 12/1998 | Rappenecker et al. |
| 5,863,708 A | 1/1999 | Zanzucchi et al. |
| 5,887,847 A | 3/1999 | Holborow |
| 5,893,389 A | 4/1999 | Cunningham |
| 5,901,939 A | 5/1999 | Cabuz et al. |
| 5,911,872 A | 6/1999 | Lewis et al. |
| 5,918,852 A | 7/1999 | Otto |
| 5,933,573 A | 8/1999 | Lukenich et al. |
| 5,944,257 A | 8/1999 | Dietiker et al. |
| 5,954,079 A | 9/1999 | Barth et al. |
| 5,954,089 A | 9/1999 | Seymour |
| 5,957,158 A | 9/1999 | Volz et al. |
| 5,959,448 A | 9/1999 | Baranski et al. |
| 5,967,124 A | 10/1999 | Cook et al. |
| 5,971,355 A | 10/1999 | Biegelsen et al. |
| 5,971,746 A | 10/1999 | Givens et al. |
| 5,986,573 A | 11/1999 | Franklin et al. |
| 5,997,280 A | 12/1999 | Welz, Jr. et al. |
| 6,003,552 A | 12/1999 | Shank et al. |
| 6,050,281 A | 4/2000 | Adams et al. |
| 6,057,771 A | 5/2000 | Lakra |
| 6,106,245 A | 8/2000 | Cabuz |
| 6,109,889 A | 8/2000 | Zengerle et al. |
| 6,116,863 A | 9/2000 | Ahn et al. |
| 6,122,973 A | 9/2000 | Nomura et al. |
| 6,128,946 A * | 10/2000 | Leon ............... F16K 5/0663 73/40.5 A |
| 6,151,967 A | 11/2000 | McIntosh et al. |
| 6,152,168 A | 11/2000 | Ohmi et al. |
| 6,155,531 A | 12/2000 | Holborow et al. |
| 6,167,761 B1 | 1/2001 | Hanzawa et al. |
| 6,176,247 B1 | 1/2001 | Winchcomb et al. |
| 6,179,000 B1 | 1/2001 | Zdobinski et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,189,568 B1 | 2/2001 | Bergum et al. |
| 6,213,758 B1 | 4/2001 | Tesar et al. |
| 6,215,221 B1 | 4/2001 | Cabuz et al. |
| 6,240,944 B1 | 6/2001 | Ohnstein et al. |
| 6,242,909 B1 | 6/2001 | Dorsey et al. |
| 6,247,919 B1 | 6/2001 | Welz, Jr. et al. |
| 6,255,609 B1 | 7/2001 | Samuelson et al. |
| 6,263,908 B1 | 7/2001 | Love et al. |
| 6,288,472 B1 | 9/2001 | Cabuz et al. |
| 6,297,640 B1 | 10/2001 | Hayes |
| 6,321,781 B1 | 11/2001 | Kurth |
| 6,360,773 B1 | 3/2002 | Rhodes |
| 6,373,682 B1 | 4/2002 | Goodwin-Johansson |
| 6,386,234 B2 | 5/2002 | Sontag |
| 6,390,027 B1 | 5/2002 | Lyons et al. |
| 6,397,798 B1 | 6/2002 | Fiaccabrino |
| 6,401,753 B2 | 6/2002 | Neu |
| 6,418,793 B1 | 7/2002 | Pechoux et al. |
| 6,445,053 B1 | 9/2002 | Cho |
| 6,450,200 B1 | 9/2002 | Ollivier |
| 6,460,567 B1 | 10/2002 | Hansen, III et al. |
| 6,463,546 B1 | 10/2002 | Jeske et al. |
| 6,496,348 B2 | 12/2002 | McIntosh |
| 6,496,786 B1 | 12/2002 | Dieterle et al. |
| 6,505,838 B1 | 1/2003 | Cavaliere |
| 6,508,528 B2 | 1/2003 | Fujii et al. |
| 6,520,753 B1 | 2/2003 | Grosjean et al. |
| 6,533,574 B1 | 3/2003 | Pechoux |
| 6,536,287 B2 | 3/2003 | Beekhuizen et al. |
| 6,550,495 B1 | 4/2003 | Schulze |
| 6,553,979 B2 | 4/2003 | Albright |
| 6,561,791 B1 | 5/2003 | Vrolijk et al. |
| 6,563,233 B1 | 5/2003 | Hinks |
| 6,564,824 B2 | 5/2003 | Lowery et al. |
| 6,571,817 B1 | 6/2003 | Bohan, Jr. |
| 6,572,077 B1 | 6/2003 | Worner |
| 6,579,087 B1 | 6/2003 | Vrolijk |
| 6,584,852 B2 | 7/2003 | Suzuki et al. |
| 6,590,267 B1 | 7/2003 | Goodwin-Johansson et al. |
| 6,606,911 B2 | 8/2003 | Akiyama et al. |
| 6,619,388 B2 | 9/2003 | Dietz et al. |
| 6,619,612 B2 | 9/2003 | Freisinger et al. |
| 6,623,012 B1 | 9/2003 | Perry et al. |
| 6,640,642 B1 | 11/2003 | Onose et al. |
| 6,644,351 B2 | 11/2003 | La Mama et al. |
| 6,650,211 B2 | 11/2003 | Pimouguet |
| 6,651,506 B2 | 11/2003 | Lee et al. |
| 6,651,636 B1 | 11/2003 | Albright |
| 6,651,954 B1 | 11/2003 | Porcher et al. |
| 6,655,409 B1 | 12/2003 | Steenburgh et al. |
| 6,655,652 B2 | 12/2003 | Meinhof |
| 6,658,928 B1 | 12/2003 | Pollack et al. |
| 6,676,580 B2 | 1/2004 | Tsai et al. |
| 6,704,186 B2 | 3/2004 | Ishikura |
| 6,725,167 B2 | 4/2004 | Grumstrup et al. |
| 6,728,600 B1 | 4/2004 | Contaldo et al. |
| 6,729,601 B2 | 5/2004 | Freisinger et al. |
| 6,742,541 B2 | 6/2004 | Pimouguet |
| 6,768,406 B1 | 7/2004 | Fiaccabrino |
| 6,796,326 B2 | 9/2004 | Bayer |
| 6,813,954 B2 | 11/2004 | Gokhfeld |
| 6,814,102 B2 | 11/2004 | Hess et al. |
| 6,814,339 B2 | 11/2004 | Berger et al. |
| 6,819,208 B1 | 11/2004 | Peghaire et al. |
| 6,820,650 B2 | 11/2004 | Solet et al. |
| 6,825,632 B2 | 11/2004 | Hahn et al. |
| 6,826,947 B2 | 12/2004 | Solet et al. |
| 6,851,298 B2 | 2/2005 | Miura et al. |
| 6,874,367 B2 | 4/2005 | Jakobsen |
| 6,877,380 B2 | 4/2005 | Lewis |
| 6,877,383 B2 | 4/2005 | Horie et al. |
| 6,880,548 B2 | 4/2005 | Schultz et al. |
| 6,880,567 B2 | 4/2005 | Klaver et al. |
| 6,885,184 B1 | 4/2005 | Gofman |
| 6,888,354 B1 | 5/2005 | Gofman |
| 6,889,705 B2 | 5/2005 | Newman et al. |
| 6,892,756 B2 | 5/2005 | Schulze |
| 6,903,526 B2 | 6/2005 | Weisser et al. |

(56) References Cited

U.S. PATENT DOCUMENTS

| | | |
|---|---|---|
| 6,906,484 B1 | 6/2005 | Berroth et al. |
| 6,923,069 B1 | 8/2005 | Stewart |
| 6,949,903 B2 | 9/2005 | Berroth et al. |
| 6,956,340 B2 | 10/2005 | Schondelmaier et al. |
| 6,956,343 B2 | 10/2005 | Berroth et al. |
| 6,968,851 B2 | 11/2005 | Ramirez et al. |
| 6,981,426 B2 | 1/2006 | Wang et al. |
| 6,983,759 B2 | 1/2006 | Maichel et al. |
| 6,994,308 B1 | 2/2006 | Wang et al. |
| 6,997,684 B2 | 2/2006 | Hahn et al. |
| 7,000,635 B2 | 2/2006 | Erbe et al. |
| 7,004,034 B2 | 2/2006 | Chen |
| 7,036,791 B2 | 5/2006 | Wiese |
| 7,039,502 B2 | 5/2006 | Berwanger et al. |
| 7,066,203 B2 | 6/2006 | Baarda |
| 7,082,835 B2 | 8/2006 | Cook et al. |
| 7,089,086 B2 | 8/2006 | Schoonover |
| 7,089,959 B2 | 8/2006 | Cai |
| 7,093,611 B2 | 8/2006 | Murray et al. |
| 7,107,820 B2 | 9/2006 | Nunnally et al. |
| 7,119,504 B2 | 10/2006 | Dornhof |
| 7,121,525 B2 | 10/2006 | Gelez |
| 7,174,771 B2 | 2/2007 | Cooper |
| 7,216,547 B1 | 5/2007 | Stewart et al. |
| 7,223,094 B2 | 5/2007 | Goebel |
| 7,225,056 B2 | 5/2007 | Bolduan et al. |
| 7,249,610 B2 | 7/2007 | Moses |
| 7,260,994 B2 | 8/2007 | Oboodi et al. |
| 7,290,502 B2 | 11/2007 | Kidd et al. |
| 7,290,902 B2 | 11/2007 | Suehiro et al. |
| 7,297,640 B2 | 11/2007 | Xie et al. |
| 7,302,863 B2 | 12/2007 | Kielb et al. |
| 7,319,300 B2 | 1/2008 | Hahn |
| 7,328,719 B2 | 2/2008 | Madden |
| 7,347,221 B2 | 3/2008 | Berger et al. |
| 7,360,751 B2 | 4/2008 | Herrfurth |
| 7,390,172 B2 | 6/2008 | Winkler |
| 7,398,796 B2 | 7/2008 | Hjorth et al. |
| 7,402,925 B2 | 7/2008 | Best et al. |
| 7,405,609 B2 | 7/2008 | Krotsch |
| 7,422,028 B2 | 9/2008 | Nugent et al. |
| 7,451,600 B2 | 11/2008 | Patel et al. |
| 7,451,644 B2 | 11/2008 | Karte |
| 7,453,696 B2 | 11/2008 | Tungl et al. |
| 7,461,828 B2 | 12/2008 | Kidprasert |
| 7,493,822 B2 | 2/2009 | Stewart et al. |
| 7,503,221 B2 | 3/2009 | Wade |
| 7,520,487 B2 | 4/2009 | Mattes |
| 7,537,019 B2 | 5/2009 | Ting et al. |
| 7,543,604 B2 | 6/2009 | Benda |
| 7,553,151 B2 | 6/2009 | O'Mara et al. |
| 7,554,279 B2 | 6/2009 | Loffler et al. |
| 7,556,238 B2 | 7/2009 | Seberger |
| 7,574,896 B1 | 8/2009 | Cooper |
| 7,586,228 B2 | 9/2009 | Best |
| 7,586,276 B2 | 9/2009 | Dornhof |
| 7,624,755 B2 | 12/2009 | Benda et al. |
| 7,627,455 B2 | 12/2009 | Lenz et al. |
| 7,644,731 B2 | 1/2010 | Benda et al. |
| 7,647,842 B1 | 1/2010 | Killian et al. |
| 7,669,461 B2 | 3/2010 | Kates et al. |
| 7,688,011 B2 | 3/2010 | Berroth et al. |
| 7,715,168 B2 | 5/2010 | Gofman et al. |
| 7,740,024 B2 | 6/2010 | Brodeur et al. |
| 7,759,884 B2 | 7/2010 | Dufner et al. |
| 7,769,493 B2 | 8/2010 | Elshafei et al. |
| 7,811,069 B2 | 10/2010 | Fleig |
| 7,812,488 B2 | 10/2010 | Cosco et al. |
| 7,816,813 B2 | 10/2010 | Yagudayev et al. |
| 7,841,541 B2 | 11/2010 | Ardelt et al. |
| 7,869,971 B2 | 1/2011 | Varga |
| 7,880,421 B2 | 2/2011 | Karwath |
| 7,880,427 B2 | 2/2011 | Foll et al. |
| 7,890,216 B2 | 2/2011 | Boger et al. |
| 7,890,276 B2 | 2/2011 | Killion et al. |
| 7,891,972 B2 | 2/2011 | Blank et al. |
| 7,898,372 B2 | 3/2011 | Melchionne, Jr. |
| 7,902,776 B2 | 3/2011 | Karwath |
| 7,904,608 B2 | 3/2011 | Price |
| 7,905,251 B2 | 3/2011 | Flanders |
| 7,922,481 B2 | 4/2011 | Geiger et al. |
| 7,940,189 B2 | 5/2011 | Brown |
| 8,020,585 B2 | 9/2011 | Shock et al. |
| 8,024,978 B2 | 9/2011 | Khemet et al. |
| 8,036,837 B2 | 10/2011 | Wilke |
| 8,061,212 B2 | 11/2011 | Shubert |
| 8,066,255 B2 | 11/2011 | Wang |
| 8,099,248 B2 | 1/2012 | Umekage et al. |
| 8,104,510 B2 | 1/2012 | Ams et al. |
| 8,109,289 B2 | 2/2012 | Trnka et al. |
| 8,126,631 B2 | 2/2012 | Scalia, Jr. |
| 8,205,484 B2 | 6/2012 | Sasaki |
| 8,212,507 B2 | 7/2012 | Wystup et al. |
| 8,225,814 B2 | 7/2012 | Igarashi |
| 8,235,064 B2 | 8/2012 | Kasprzyk et al. |
| 8,240,636 B2 | 8/2012 | Smith |
| 8,258,660 B2 | 9/2012 | Strobel et al. |
| 8,265,794 B2 | 9/2012 | Minervini et al. |
| 8,271,141 B2 | 9/2012 | Cummings et al. |
| 8,286,937 B2 | 10/2012 | Forster |
| 8,297,948 B2 | 10/2012 | Laufer et al. |
| 8,307,845 B2 | 11/2012 | Kouchi et al. |
| 8,319,461 B2 | 11/2012 | Wystup et al. |
| 8,353,281 B2 | 1/2013 | Oberhomburg et al. |
| 8,380,448 B2 | 2/2013 | Franklin |
| 8,381,760 B2 | 2/2013 | Santinanavat et al. |
| 8,387,441 B2 | 3/2013 | Falta et al. |
| 8,439,667 B2 | 5/2013 | Fan et al. |
| 8,473,229 B2 | 6/2013 | Kucera et al. |
| 8,500,441 B2 | 8/2013 | Geiger et al. |
| 8,539,972 B2 | 9/2013 | Xu |
| 8,550,109 B2 | 10/2013 | Miyata et al. |
| 8,567,757 B2 | 10/2013 | Pitchford et al. |
| 8,596,957 B2 | 12/2013 | Seebauer |
| 8,636,501 B2 | 1/2014 | Geiger et al. |
| 8,639,464 B2 | 1/2014 | Artiuch et al. |
| 8,677,913 B2 | 3/2014 | Kastingschafer et al. |
| 8,721,325 B2 | 5/2014 | Geiger et al. |
| 8,746,275 B2 | 6/2014 | Santinanavat et al. |
| 8,839,815 B2 | 9/2014 | Young et al. |
| 8,899,264 B2 | 12/2014 | Young et al. |
| 8,905,063 B2 | 12/2014 | Young et al. |
| 8,947,242 B2 | 2/2015 | Kucera et al. |
| 9,020,765 B2 | 4/2015 | Seebauer |
| 9,074,770 B2 | 7/2015 | Young et al. |
| 9,109,610 B2 | 8/2015 | Streng et al. |
| 9,222,816 B2 | 12/2015 | Patel et al. |
| 9,234,661 B2 | 1/2016 | Young et al. |
| 9,557,059 B2 | 1/2017 | Kucera et al. |
| 9,645,584 B2 * | 5/2017 | Kucera ............... F23N 1/002 |
| 2002/0029808 A1 | 3/2002 | Friend et al. |
| 2002/0175791 A1 | 11/2002 | LaMarca et al. |
| 2003/0167851 A1 | 9/2003 | Parker |
| 2004/0035211 A1 | 2/2004 | Pinto et al. |
| 2004/0217182 A1 | 11/2004 | St. Jean et al. |
| 2005/0199286 A1 | 9/2005 | Appleford et al. |
| 2005/0279956 A1 | 12/2005 | Berger et al. |
| 2006/0226299 A1 | 10/2006 | Tungl et al. |
| 2006/0243334 A1 | 11/2006 | Brochhaus et al. |
| 2006/0272712 A1 | 12/2006 | Sontag |
| 2006/0278281 A1 | 12/2006 | Gynz-Rekowski et al. |
| 2007/0024225 A1 | 2/2007 | Hahn et al. |
| 2007/0024255 A1 | 2/2007 | Yasumura |
| 2007/0068511 A1 | 3/2007 | Bachinsky et al. |
| 2007/0082304 A1 | 4/2007 | Burnham et al. |
| 2007/0089789 A1 | 4/2007 | Mudd et al. |
| 2007/0164243 A1 | 7/2007 | Volz |
| 2007/0256478 A1 | 11/2007 | Guadagnola et al. |
| 2008/0099082 A1 | 5/2008 | Moenkhaus |
| 2008/0110268 A1 * | 5/2008 | Saito ............... G01K 1/14 73/708 |
| 2008/0157707 A1 | 7/2008 | Jeske et al. |
| 2008/0318098 A1 | 12/2008 | Matsunaga |
| 2009/0068503 A1 | 3/2009 | Yamazaki et al. |

(56) References Cited

U.S. PATENT DOCUMENTS

| | | |
|---|---|---|
| 2009/0105852 A1 | 4/2009 | Wintrich et al. |
| 2009/0120338 A1 | 5/2009 | Adendorff et al. |
| 2009/0126798 A1 | 5/2009 | Mather |
| 2009/0142717 A1 | 6/2009 | Lavelle |
| 2009/0197212 A1 | 8/2009 | Masen |
| 2009/0280989 A1 | 11/2009 | Astra et al. |
| 2009/0288399 A1 | 11/2009 | Fayard |
| 2009/0303076 A1 | 12/2009 | Setiadi et al. |
| 2010/0112500 A1 | 5/2010 | Maiello et al. |
| 2010/0138167 A1 | 6/2010 | Bessyo et al. |
| 2010/0146939 A1 | 6/2010 | Sim et al. |
| 2010/0330515 A1* | 12/2010 | Ueki ............ F23N 5/242 431/22 |
| 2011/0039217 A1 | 2/2011 | Happe |
| 2011/0041483 A1 | 2/2011 | Kapparos |
| 2011/0240157 A1 | 10/2011 | Jones et al. |
| 2011/0266473 A1 | 11/2011 | Santinanavat et al. |
| 2012/0107753 A1 | 5/2012 | Kemp |
| 2013/0153041 A1 | 6/2013 | Kucera et al. |
| 2013/0153042 A1 | 6/2013 | Young et al. |
| 2013/0153798 A1 | 6/2013 | Kucera et al. |
| 2014/0096850 A1 | 4/2014 | Filkovski et al. |
| 2014/0230915 A1* | 8/2014 | Mudd ............ G05D 7/0647 137/15.08 |
| 2015/0045971 A1 | 2/2015 | Endel et al. |
| 2015/0107675 A1 | 4/2015 | Kucera |
| 2015/0168956 A1* | 6/2015 | Guan ............ G01N 30/32 137/2 |
| 2015/0362393 A1* | 12/2015 | Soccol ............ G01N 29/036 73/31.04 |
| 2016/0123584 A1 | 5/2016 | Young et al. |
| 2016/0326967 A1 | 11/2016 | Yamamoto et al. |

FOREIGN PATENT DOCUMENTS

| | | |
|---|---|---|
| DE | 19824521 A1 | 12/1999 |
| DE | 102005033611 B3 | 10/2006 |
| EP | 0062854 A1 | 10/1982 |
| EP | 0068517 B1 | 1/1986 |
| EP | 0275439 A1 | 7/1988 |
| EP | 0282758 A2 | 9/1988 |
| EP | 0356690 A1 | 3/1990 |
| EP | 0522479 A2 | 1/1993 |
| EP | 0563787 A1 | 10/1993 |
| EP | 0617234 A1 | 9/1994 |
| EP | 0645562 A1 | 3/1995 |
| EP | 0652501 A2 | 5/1995 |
| EP | 0664422 A1 | 7/1995 |
| EP | 0665396 A1 | 8/1995 |
| EP | 0678178 A1 | 10/1995 |
| EP | 0744821 A2 | 11/1996 |
| EP | 0757200 A2 | 2/1997 |
| EP | 0822376 A2 | 2/1998 |
| EP | 0817931 B1 | 12/1998 |
| EP | 0881435 A1 | 12/1998 |
| EP | 0896191 A2 | 2/1999 |
| EP | 0896192 A2 | 2/1999 |
| EP | 0907052 A2 | 4/1999 |
| EP | 0817934 B1 | 5/1999 |
| EP | 0952357 A1 | 10/1999 |
| EP | 0976957 A2 | 2/2000 |
| EP | 1031792 A2 | 8/2000 |
| EP | 1069357 A2 | 1/2001 |
| EP | 1073192 A2 | 1/2001 |
| EP | 1084357 A2 | 3/2001 |
| EP | 1084358 A1 | 3/2001 |
| EP | 1121511 A1 | 8/2001 |
| EP | 1176317 A1 | 1/2002 |
| EP | 1186779 A1 | 3/2002 |
| EP | 1157205 B1 | 9/2002 |
| EP | 0992658 B1 | 5/2003 |
| EP | 1323966 A1 | 7/2003 |
| EP | 1078187 B1 | 8/2003 |
| EP | 1382907 A1 | 1/2004 |
| EP | 1403885 A2 | 3/2004 |
| EP | 1269054 B1 | 8/2004 |
| EP | 1484509 A1 | 12/2004 |
| EP | 1191676 B1 | 1/2005 |
| EP | 1275039 B1 | 1/2005 |
| EP | 1446607 B1 | 3/2005 |
| EP | 1510756 A1 | 3/2005 |
| EP | 1299665 B1 | 4/2005 |
| EP | 1324496 B1 | 6/2005 |
| EP | 0751350 B1 | 9/2005 |
| EP | 1584870 A2 | 10/2005 |
| EP | 1243857 B1 | 12/2005 |
| EP | 1282798 B1 | 12/2005 |
| EP | 1424708 B1 | 12/2005 |
| EP | 0843287 B1 | 2/2006 |
| EP | 1346463 B1 | 3/2006 |
| EP | 1535388 B1 | 6/2006 |
| EP | 1703140 A1 | 9/2006 |
| EP | 1703146 A2 | 9/2006 |
| EP | 1183772 B1 | 10/2006 |
| EP | 1303718 B1 | 10/2006 |
| EP | 1314240 B1 | 10/2006 |
| EP | 1715229 A2 | 10/2006 |
| EP | 1256763 B1 | 11/2006 |
| EP | 1727268 A2 | 11/2006 |
| EP | 1559936 B1 | 12/2006 |
| EP | 1748534 A2 | 1/2007 |
| EP | 1748545 A2 | 1/2007 |
| EP | 1327808 B1 | 2/2007 |
| EP | 1329659 B1 | 2/2007 |
| EP | 1291532 B1 | 6/2007 |
| EP | 1610046 B1 | 6/2007 |
| EP | 1592905 B1 | 7/2007 |
| EP | 1610045 B1 | 7/2007 |
| EP | 1727261 B1 | 10/2007 |
| EP | 1860328 A1 | 11/2007 |
| EP | 1626321 B1 | 2/2008 |
| EP | 1848907 B1 | 4/2008 |
| EP | 1936778 A2 | 6/2008 |
| EP | 1413045 B1 | 7/2008 |
| EP | 1499008 B1 | 10/2008 |
| EP | 1882882 A2 | 10/2008 |
| EP | 1536169 B1 | 11/2008 |
| EP | 1298679 B1 | 12/2008 |
| EP | 1714040 B1 | 12/2008 |
| EP | 2014979 A2 | 1/2009 |
| EP | 1669648 B1 | 2/2009 |
| EP | 2048439 A1 | 4/2009 |
| EP | 1659462 B1 | 6/2009 |
| EP | 2093545 B1 | 8/2009 |
| EP | 2107248 A2 | 10/2009 |
| EP | 2116857 A1 | 11/2009 |
| EP | 2119946 A1 | 11/2009 |
| EP | 1370787 B1 | 3/2010 |
| EP | 1413044 B1 | 3/2010 |
| EP | 2164164 A1 | 3/2010 |
| EP | 2177796 A2 | 4/2010 |
| EP | 2178201 A1 | 4/2010 |
| EP | 1970610 B1 | 5/2010 |
| EP | 2197101 | 6/2010 |
| EP | 2068056 B1 | 8/2010 |
| EP | 1712800 B1 | 10/2010 |
| EP | 2118493 B1 | 10/2010 |
| EP | 2242344 A1 | 10/2010 |
| EP | 1715582 B1 | 11/2010 |
| EP | 1675757 B1 | 12/2010 |
| EP | 2267883 A1 | 12/2010 |
| EP | 1703139 B1 | 1/2011 |
| EP | 2286976 A1 | 2/2011 |
| EP | 1596495 B1 | 4/2011 |
| EP | 2212984 B1 | 4/2011 |
| EP | 2306622 A1 | 4/2011 |
| EP | 2010500 B1 | 6/2011 |
| EP | 2113696 B1 | 7/2011 |
| EP | 2604924 B1 | 5/2015 |
| GB | 2099158 A | 12/1982 |
| GB | 2327750 A | 2/1999 |
| JP | 02086258 A | 3/1990 |
| JP | 05219760 A | 8/1993 |

(56) References Cited

FOREIGN PATENT DOCUMENTS

| | | |
|---|---|---|
| JP | 9061284 A | 3/1997 |
| JP | 9184600 A | 7/1997 |
| JP | 2004125809 A | 4/2004 |
| JP | 2004309159 A | 11/2004 |
| JP | 2008135922 A | 6/2008 |
| JP | 2008286478 A | 11/2008 |
| SU | 744877 B | 6/1980 |
| WO | 8705375 A1 | 9/1987 |
| WO | 9627095 A1 | 9/1996 |
| WO | 9729538 A1 | 8/1997 |
| WO | 9801709 A2 | 1/1998 |
| WO | 9924758 A1 | 5/1999 |
| WO | 9960292 A1 | 11/1999 |
| WO | 9964769 A2 | 12/1999 |
| WO | 9964770 A1 | 12/1999 |
| WO | 0028215 A1 | 5/2000 |
| WO | 0106179 A1 | 1/2001 |
| WO | 0133078 A1 | 5/2001 |
| WO | 0161226 A1 | 8/2001 |
| WO | 0173297 A2 | 10/2001 |
| WO | 0190617 A1 | 11/2001 |
| WO | 0204852 A1 | 1/2002 |
| WO | 02077502 A1 | 10/2002 |
| WO | 02084156 A1 | 10/2002 |
| WO | 02086365 A1 | 10/2002 |
| WO | 02086918 A1 | 10/2002 |
| WO | 02097840 A1 | 12/2002 |
| WO | 2004059830 A2 | 7/2004 |
| WO | 2004070245 A1 | 8/2004 |
| WO | 2005042313 A1 | 5/2005 |
| WO | 2005076455 A1 | 8/2005 |
| WO | 2005076456 A1 | 8/2005 |
| WO | 2005085652 A1 | 9/2005 |
| WO | 2005094150 A1 | 10/2005 |
| WO | 2006000366 A1 | 1/2006 |
| WO | 2006000367 A1 | 1/2006 |
| WO | 2006039956 A1 | 4/2006 |
| WO | 2006042635 A1 | 4/2006 |
| WO | 2006053816 A1 | 5/2006 |
| WO | 2006077069 A1 | 7/2006 |
| WO | 2006088367 A2 | 8/2006 |
| WO | 2007012419 A2 | 2/2007 |
| WO | 2007018876 A1 | 2/2007 |
| WO | 2007093312 A1 | 8/2007 |
| WO | 2007140927 A1 | 12/2007 |
| WO | 2008061575 A1 | 3/2008 |
| WO | 2008039061 A1 | 4/2008 |
| WO | 2008119404 A1 | 10/2008 |
| WO | 2008141911 A1 | 11/2008 |
| WO | 2008148401 A1 | 12/2008 |
| WO | 2009000481 A1 | 12/2008 |
| WO | 2009049694 A1 | 4/2009 |
| WO | 2009065815 A2 | 5/2009 |
| WO | 2009073510 A2 | 6/2009 |
| WO | 2009089857 A1 | 7/2009 |
| WO | 2009126020 A1 | 10/2009 |
| WO | 2010018192 A2 | 2/2010 |
| WO | 2010052137 A2 | 5/2010 |
| WO | 2010056111 A1 | 5/2010 |
| WO | 2010083877 A1 | 7/2010 |
| WO | 2011010274 A1 | 1/2011 |
| WO | 2011045776 A1 | 4/2011 |
| WO | 2011047895 A1 | 4/2011 |
| WO | 2011051002 A1 | 5/2011 |
| WO | 2011069805 A1 | 6/2011 |
| WO | 2011072888 A1 | 6/2011 |
| WO | 2011092011 A2 | 8/2011 |
| WO | 2011095928 A1 | 8/2011 |

OTHER PUBLICATIONS

A Communication of Notice of Opposition for EP Application No. 12196398.7 dated Feb. 15, 2016.
A Communication of a Letter from the Opponent for EP Application No. 12196398.7 dated Feb. 9, 2017.
The Response to Opposition for EP Application No. 12196398.7 dated Jul. 15, 2016.
https://en.wikipedia.org/wiki/SCADA, SCADA—Wikipedia the Free Encyclopedia, 11 pages, printed Mar. 29, 2016.
Minami et al., "Fabrication of Distributed Electrostatic Micro Actuator (DEMA)," IEEE Journal of Microelectromechanical Systems, vol. 2, No. 3, pp. 121-127, Sep. 1993.
Ohnstein et al., "Micromachined Silicon Microvalve," IEEE, pp. 95-98, 1990.
Porex Technologies, brochure, 4 pages, prior to Dec. 29, 2004.
Shikida et al., "Characteristics of an Electrostatically-Driven Gas Valve Under High Pressure Conditions," IEEE, pp. 235-240, 1994.
Shikida et al., "Electrostatically Driven Gas Valve With High Conductance," IEEE Journal of Microelectromechanical Systems, vol. 3, No. 2, pp. 76-80, Jun. 1994.
Shikida et al., "Fabrication of an S-Shaped Microactuator," IEEE Journal of Microelectromechanical Systems, vol. 6, No. 1, pp. 18-24, Mar. 1997.
Siemens Building Technologies, "Double Gas Valves VGD20 . . . , VGD40 . . . ," 12 pages, Aug. 5, 2002.
Siemens Building Technologies, Inc., "Siemens Technical Instructions Document No. 155-512P25VG . . . ," 12 pages, Aug. 11, 2005.
Siemens Building Technologies, Inc., "SKP . . . 15U . . . Gas Valve Actuator with Safety Shutoff Function," Document No. 155-751 SKP15 . . . U. . . , 5 pages, Jul. 1, 2005.
Siemens Building Technologies, Inc., "SKP25 . . . U . . . Air/Gas Ratio Controlling Gas Valve Actuator with Safety Shutoff Function," Technical Instructions Document No. 155-754, SKP25 . . . U, 9 pages, Jul. 1, 2005.
Siemens Building Technologies, Inc., "SKP25 . . . U . . . Pressure Regulating Gas Valve Actuator with Safety Shut-Off Function," Technical Instructions Document No. 155-752, SKP25 . . . U, 7 pages, Jul. 1, 2005.
Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.
Universal Metering, "SmartValve Wireless Shut-Off Valve," Universal Metering Ltd., 4 pages, prior to Mar. 12, 2011.
Wagner et al., "Bistable Microvalve with Pneumatically Coupled Membranes," IEEE, pp. 384-388, 1996.
Wilkerson, "Understanding Valve Actuatior Diagnostics," Control Engineering, vol. 56, No. 11, 4 pages, Nov. 2009.
www.combustion911.com/products/valve-proving-controls-tc-410.html, "Kromschroeder Valve Proving Controls TC410," 7 pages, prior to Dec. 15, 2011, printed May 23, 2012.
Yang et al., "Fluorescent Porous Polymer Films as TNT Chemosensors: Electronic and Structural Effects", J. Am. Chem. Soc., pp. 11864-11873, 1998.
Yang et al., "Porous Shape Persistent Fluorescent Polymer Films: An Approach to TNT Sensory Materials", J. Am. Chem. Soc., pp. 5321-5322, 1998.
"Flexible, Compact and with a High Performance—the New Valvario, G. Kromschroder AG Launches it's New, Improved Series of Gas Fittings," Press Release, 2 pages, 2003.
"Large-Scale Linearization Circuit for Electrostatic Motors" IBM Technical Disclosure Bulletin, IBM Corporation, vol. 37, No. 10, pp. 563-564, Oct. 1, 1994.
ASCO RedHat, "2-Way Normally Closed General Purpose & Watertight Enclosure Gas Shutoff Valves ¾" to 3" NPT, 2/2 Series 8214 (200) AH(E) V710(B)," 6 pages, prior to Dec. 15, 2011.
ASCO RedHat, "2-Way Normally Closed General Purpose & Watertight Enclosure Gas Shutoff Valves ¾" to 3" NPT, 2/2 Series 8214 (200)," 8 pages, prior to Dec. 15, 2011.
ASCO Valve, Inc., "8290 Series Angle Body Piston Valves, Introducing the All New 8290 Assembly Configurator," 12 pages, prior to Dec. 15, 2011.
ASCO, "2-Way Normally Closed V710(B) Valve Body Pipe Sizes ¾" to 3" NPT, Series V710(B)," 4 pages, prior to Dec. 15, 2011.
ASCO, "On/Off General Purpose & Watertight Hydramotor Actuator for Use with V710 Gas Valve Body, Series AH2E," 2 pages, prior to Dec. 15, 2011.

(56) References Cited

OTHER PUBLICATIONS

Athavale et al., "Coupled Electrostatics-Structures-Fluidic Simulations of a Bead Mesopump," Proceedings of the International Mechanical Engineers Congress & Exhibition, pp. 1-7, Oct. 1999.
Bertz et al., "Silicon Grooves With Sidewall Angles Down to 1° made by Dry Etching," pp. 331-339, prior to Dec. 29, 2004.
Bonne et al. "Actuation-Based Fuel Gas Microsensors," IGT Symposium on Natural Gas Quality, Energy Measurement, Metering and Utilization Practices, 17 pages, Mar. 2001.
Branebjerg, "A New Electrostatic Actuator Providing Improved Stroke Length and Force," IEEE, pp. 6-11, Feb. 4-7, 1992.
Bustgens et al., "Micropump Manufactured by Thermoplastic Molding," IEEE, pp. 18-21, 1994.
Cabuz et al., "Factors Enhancing the Reliability of Touch-Mode Electrostatic Actuators," Sensors and Actuators 79, pp. 245-250, 2000.
Cabuz et al., "Mesoscopic Sampler Based on 3D Array of Electrostatically Activated Diaphragms," Proceedings of the 10th Int. Conf. On Solid-State Sensors and Actuators, Transducers 1999.
Cabuz et al., "The Dual Diaphragm Pump," 4 pages prior to Dec. 29, 2004.
Cabuz, "Dielectric Related Effects in Micromachined Electrostatic Actuators," IEEE, 1999 Conference on Electrical Insulation and Dielectric Phenomena, pp. 327-332, 1999.
Cabuz, "Electrical Phenomena at the Interface of Rolling-Contact, Electrostatic Actuators," 16 pages, prior to Dec. 29, 2004.
Cabuz, et al., "High Reliability Touch-Mode Electrostatic Actuators", Technical Digest of the Solid State Sensor and Actuator Workshop, Hilton Head, S.C., pp. 296-299, Jun. 8-11, 1998.
Cabuz. "Tradeoffs in MEMS Materials," SPIE, vol. 2881, pp. 160-170, prior to Dec. 29, 2004.
Carlisle, "10 Tips on Valve-Proving Systems," Karl Dungs Inc., 5 pages, Aug. 1, 2002, printed May 23, 2012.
European Search Report for EP Application No. 12196394.6 dated May 23, 2013.
European Search Report for EP Application No. 12196396.1 dated Jun. 11, 2013.
European Search Report for EP Application No. 12196398.7 dated Jun. 11, 2013.
Examination Report for EP Application No. 12196398.7, dated Apr. 11, 2014.
CSA, "B149.351-07 Supplement No. 1 to CAN/CAS-B149.3-05 Code for the Field Approval of Fuel-Related Components on Appliances and Equipment," 40 pages, Jan. 2007.
Dungs Combustion Controls, "Double Solenoid Valve Combined Pressure Regulator and Safety Valves Infinitely Variable Operating Mode, MBC-. . . . -VEF DN65—DN100," 8 pages, prior to Dec. 15, 2011.
Dungs Combustion, Controls, "Double Solenoid Valve Combined Pressure Regulator and Safety Valves Servo Pressure Regulator MBC- . . . -SE DN 65 DN 125," 8 pages, prior to Dec. 15, 2011.
Dungs Combustion Controls, "Double Solenoid Valve Control and Safety Combination Valve Servo Pressure Controller, DMV-SE 507/11—525/11," 8 pages, prior to Dec. 15, 2011.
Dungs Combustion Controls, "Double Solenoid Valve Regulator and Safety Combination Infinitely Variable Floating Operation, DMV-VEF 507-525," 8 pages, prior to Dec. 15, 2011.
Dungs Combustion Controls, "Gas/Air Ratio Control MB-VEF, DMV-VEF," 15 pages, prior to Dec. 15, 2011.
Dungs Combustion Controls, "GasMultiBloc Combined Regulator and Safety Shut-Off Valves Two-Stage Function, MB-ZRD(LE) 415-420 B01," pp. 1-6, prior to Dec. 15, 2011.
Dungs Combustion Controls, "GasMultiBloc Combined Regulator and Safety Valve Infinitely Variable Air/Gas Ratio Control Mode, MBC-300-VEF, MBC-700-VEF, MBC-1200-VEF," 8 pages, prior to Dec. 15, 2011.
Dungs Combustion Controls, "GasMultiBloc Combined Servo Pressure Regulator and Safety Shut-Off Valves, MBC-300-SE, MBC-700-SE, MBC-1200-SE, MBC-300-N, MBC-700-N," 8 pages, prior to Dec. 15, 2011.
Dungs Combustion Controls, "Pressure Regulator FRN Zero Pressure Regulator," 4 pages, prior to Dec. 15, 2011.
Dungs Combustion Controls, "Pressure Regulator FRS," 6 pages prior to Dec. 15, 2011.
Dungs Combustion Controls, "Pressure Regulator Fru Circulation Regulator," 4 pages, prior to Dec. 15, 2011.
Dungs Combustion Controls, "Pressure Switch for Gas, Air, Flue Gases and Combustion Products, GW 500 A4, GW 500 A4/2" 6 pages, prior to Dec. 15, 2011.
Dungs Combustion Controls, "Program," 4 pages, prior to Dec. 15, 2011.
Dungs Combustion Controls, "Valve Testing System VPS 504 for Multiple Actuators," 12 pages, prior to Dec. 15, 2011.
Dungs Combustion Controls, "Valve Testing System VPS 508 for Multiple Actuators," 12 pages, prior to Dec. 15, 2011.
Freund et al., "A Chemically Diverse Conducting Polymer-Based 'Electronic Nose'," Proceedings of the National Academy of Sciences of the United States of America, vol. 92, No. 7, pp. 2652-2656, Mar. 28, 1995.
Halg, "On a Nonvolatile Memory Cell Based on Micro-Electro-Mechanics," IEEE pp. 172-176, 1990.
Honeywell Inc., "Hall Effect Sensing and Application," 126 pages, prior to Dec. 15, 2011.
Honeywell, "RM7800L1087; RM7840G1022,L1075,L1091; EC7840L1014 Relay Modules with Valve Proving," Installation Instructions, 32 pages, 2009.
Korte et al., "Smart Valve Positioners and Their Use in Safety Instrumented Systems," Industrial Valves, pp. 41-47, 2009.
Kromschroder, "Governor with Solenoid Valve VAD Air/Gas Ratio Control with Solenoid Valve VAG," 24 pages, prior to Dec. 15, 2011.
Kromschroder, "Governor with Solenoid Valve VAD Air/Gas Ratio Control with Solenoid Valve VAG," 8 pages, prior to Dec. 15, 2011.
Kromschroder, "Solenoid Valves for Gas VAS," 28, pages, prior to Dec. 15, 2011.
Kromschroder, "Solenoid Valves for Gas VAS," 8 pages, prior to Dec. 15, 2011.
Kromschroder, "Tightness Control TC," 8 pages, 2011.
Allgemein Grundlagen and Anforderungen, EN ISO 5167-1, German Translation, Chapter 3.3.6, p. 8, 2003.

\* cited by examiner

GAS VALVE WITH ELECTRONIC HEALTH MONITORING

This application is a continuation of co-pending U.S. patent application Ser. No. 14/489,068, filed Sep. 17, 2014, and entitled "GAS VALVE WITH ELECTRONIC HEALTH MONITORING", which is incorporated herein by reference.

RELATED APPLICATIONS

This application is related to U.S. application Ser. No. 13/326,366 filed Dec. 15, 2011 and entitled Gas Valve With Electronic Proof of Closure System, U.S. application Ser. No. 13/326,353 filed Dec. 15, 2011 and entitled Gas Valve With Electronic Valve Proving System, U.S. application Ser. No. 13/326,357 filed Dec. 15, 2011 and entitled Gas Valve with High/Low Gas Pressure Detection, U.S. application Ser. No. 13/326,691 filed Dec. 15, 2011 and entitled Gas Valve With Fuel Rate Monitor, U.S. application Ser. No. 13/326,355 filed Dec. 15, 2011 and entitled Gas Valve With Overpressure Diagnostics, U.S. application Ser. No. 13/326,358 filed on Dec. 15, 2011 and entitled Gas Valve With Valve Leakage Test, U.S. application Ser. No. 13/326,361 filed on Dec. 15, 2011 and entitled Gas Valve With Electronic Cycle Counter, and U.S. application Ser. No. 13/326,523 filed on Dec. 15, 2011 and entitled Gas Valve With Communication Link, all of which are incorporated by reference in their entireties and for all purposes.

TECHNICAL FIELD

The disclosure relates generally to valves, and more particularly, to gas valve assemblies.

BACKGROUND

Valves are commonly used in conjunction with many appliances for regulating the flow of fluid. For example, gas valves are often incorporated into gas-fired appliances to regulate the flow of gas to a combustion chamber or burner. Examples of such gas-fired appliances may include, but are not limited to, water heaters, furnaces, boilers, fireplace inserts, stoves, ovens, dryers, grills, deep fryers, or any other such device where gas control is desired. In such gas-fired appliances, the gas may be ignited by a pilot flame, electronic ignition source, or other ignition source, causing combustion of the gas at the burner element producing heat for the appliance. In many cases, in response to a control signal from a control device such as a thermostat or other controller, the gas valve may be moved between a closed position, which prevents gas flow, and an open position, which allows gas flow. In some instances, the gas valve may be a modulating gas valve, which allows gas to flow at one or more intermediate flow rates between the fully open position and the fully closed position. Additionally or alternatively, valves are used in one or more other applications for controlling a flow (e.g., a flow of a fluid such as a liquid or gas, or a flow of other material).

SUMMARY

This disclosure relates generally to valves, and more particularly, to gas valve assemblies. In one illustrative but non-limiting example, a valve assembly system may include a valve assembly and a user interface. A valve assembly may include a valve body having an inlet port and an outlet port with a fluid path extending therebetween, a valve situated in the fluid path, a valve actuator secured to the valve body, one or more sensors in communication with the fluid path, a controller secured relative to the valve body and in communication with the one or more sensors, and a memory secured relative to the valve body and operatively coupled to the controller. The one or more sensors may sense one or more parameters within the fluid path and the controller may determine one or more valve conditions based on the one or more sense parameters by comparing values related to the one or more sensed parameters to one or more threshold values. The memory may store two or more selectable options, wherein each selectable option identifies corresponding threshold values for the one or more threshold values. Once one or more of the selectable options are selected, the controller may be configured to use the one or more threshold values that correspond to the selected selectable options when comparing values related to the one or more sensed parameters to the one or more threshold values.

In some illustrative instances, the valve assembly may include an inlet port and an outlet port with a fluid path extending between the inlet port and the outlet port, a valve situated in the fluid path, a valve actuator secured relative to the valve body, one or more local sensors for sensing one or more parameters of the valve, the valve actuator, and/or within the valve body, one or more remote sensor inputs, and a controller secured relative to the valve body. The one or more remote sensor inputs may receive one or more sensed parameters from one or more remotely located sensors located outside of the valve body, the valve, and the valve actuator. The controller may be in communication with the plurality of local sensors and the one or more remote sensor inputs, and the controller may be configured to determine one or more valve conditions by comparing a value related to one or more of the sensed parameters of the plurality of local sensors and the sensed parameters from one or more remotely located sensors to one or more threshold values.

In some illustrative instances, the memory of the valve assembly may store one or more fixed thresholds and one or more adjustable thresholds, where the fixed thresholds may not be adjustable by users in the field. The controller of the valve assembly may shut down the valve assembly if a value related to one or more of the sensed parameters exceed one or more of the fixed thresholds. If one or more values related to the sensed parameters exceed one or more of the adjustable thresholds, the controller may allow the valve assembly to continue to operate, but may issue an alert.

In some instances, the valve assembly may operate by following a method. Illustratively, the method of operation may include receiving an input related to a selection of one or more safety standards, wherein each safety standard may designate one or more thresholds. In the illustrative method, one or more parameters of the valve assembly may be sensed and one or more values of the sensed parameters may be transferred to a controller of the valve assembly. The illustrative method may include using the controller of the valve assembly to determine one or more valve conditions based on the one or more sensed parameters and the one or more thresholds designated by the selected safety standards. In some cases, an indication of the one or more valve conditions may be displayed on a user interface of a valve assembly system.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various illustrative embodiments in connection with the accompanying drawings, in which.

Figure 1:
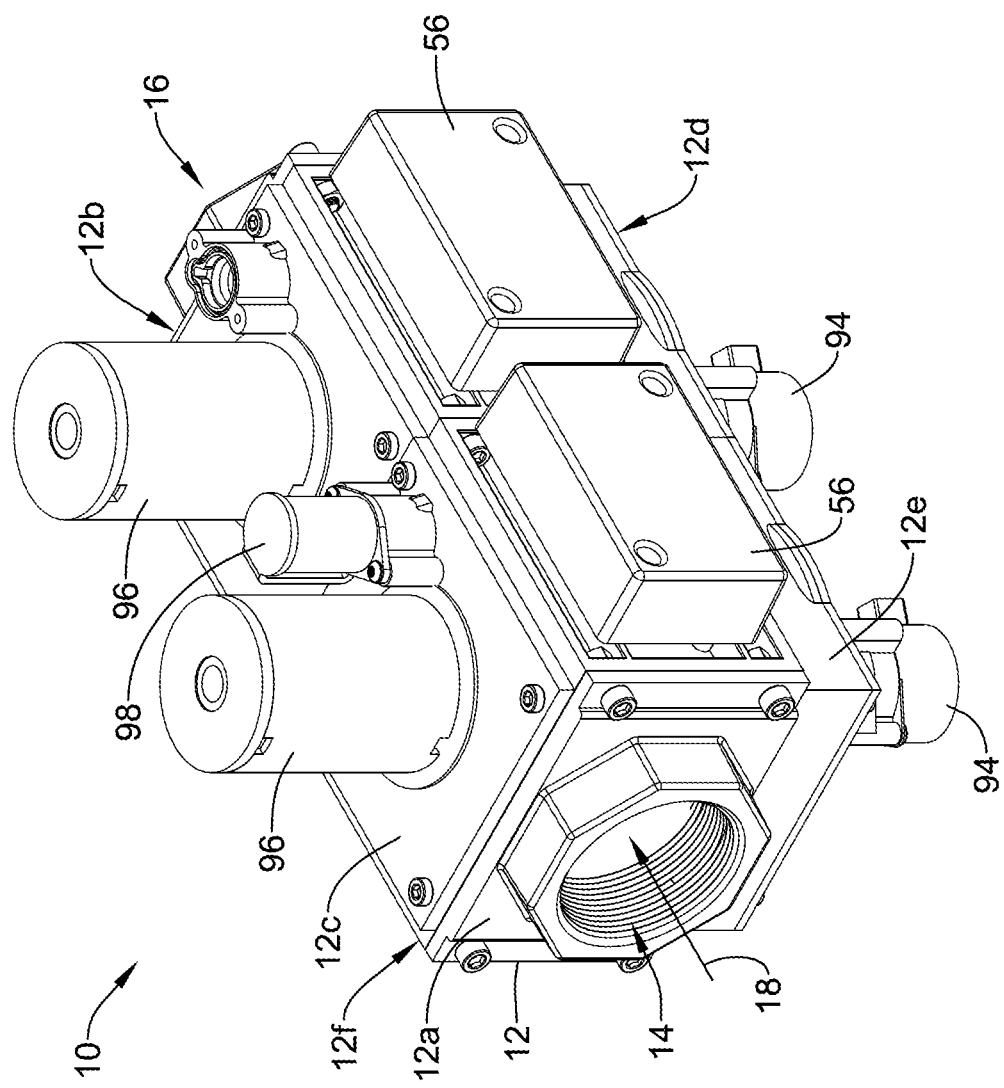
FIG. 1 is a schematic perspective view of an illustrative fluid valve assembly.
Figure 2:
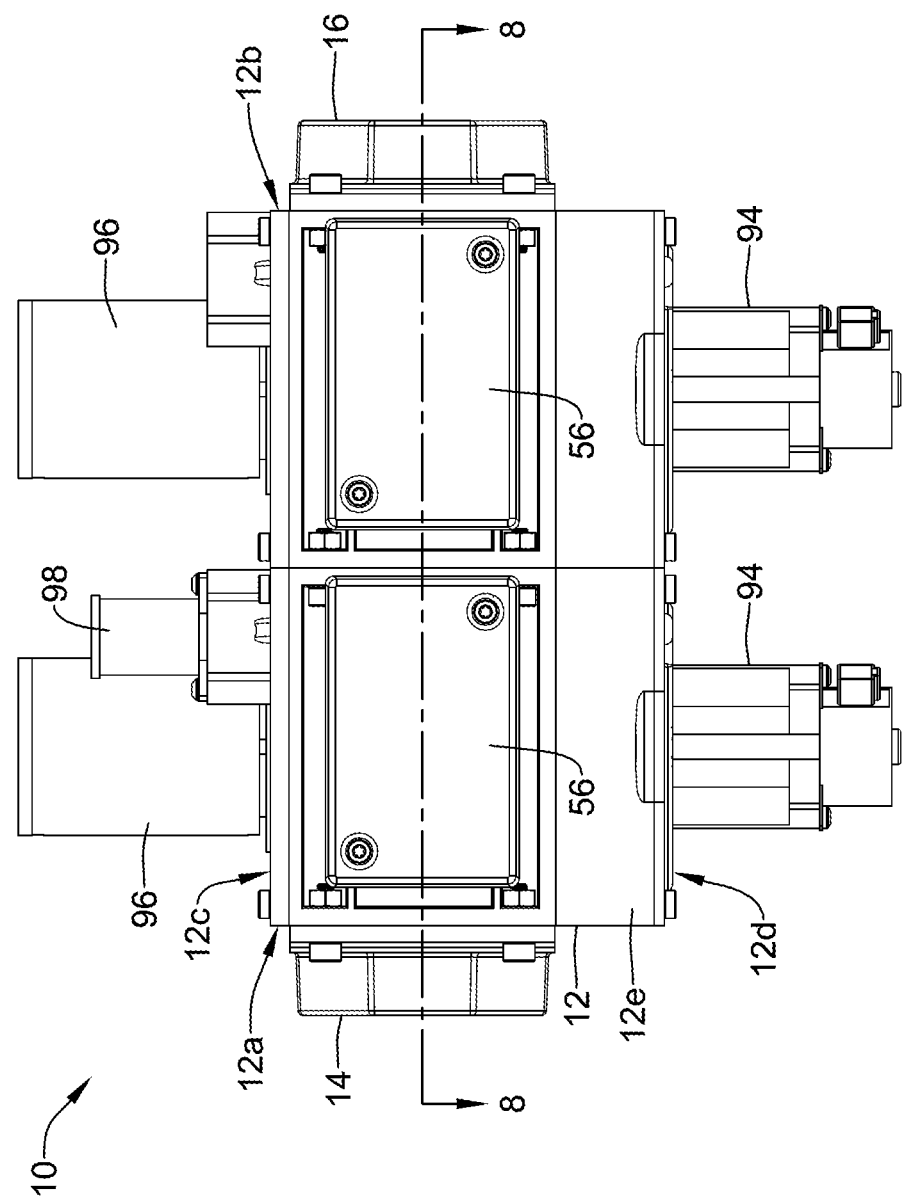
FIG. 2 is a schematic first side view of the illustrative fluid valve assembly of FIG. 1.
Figure 3:
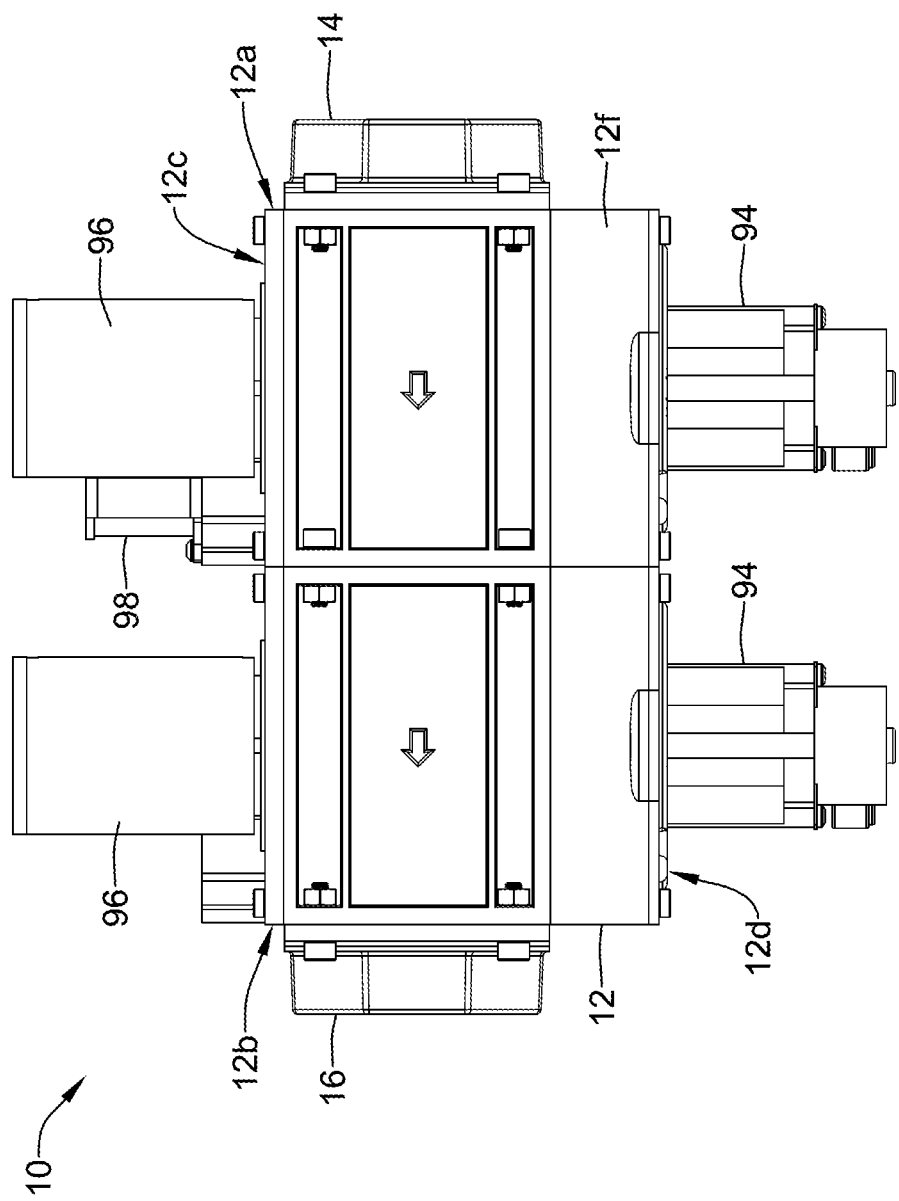
FIG. 3 is a schematic second side view of the illustrative fluid valve assembly of FIG. 1, where the second side view is from a side opposite the first side view.
Figure 4:
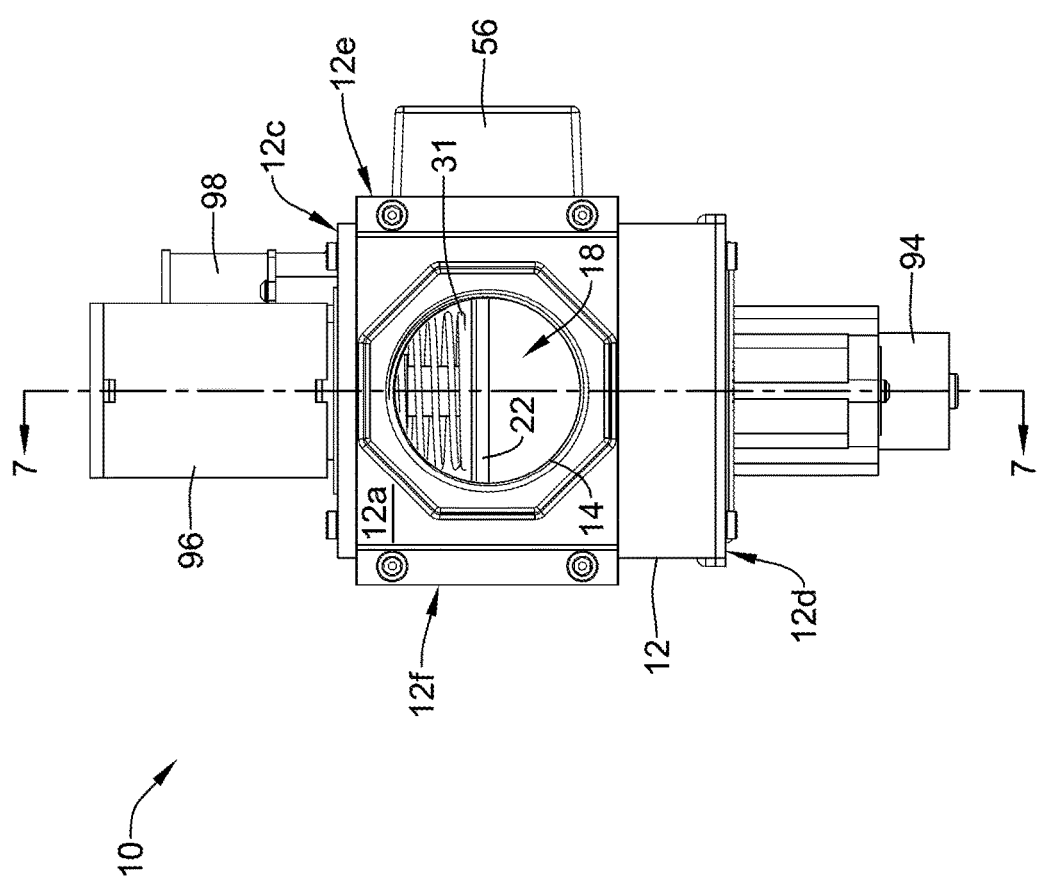
FIG. 4 is a schematic input side view of the illustrative fluid valve assembly of FIG. 1.
Figure 5:
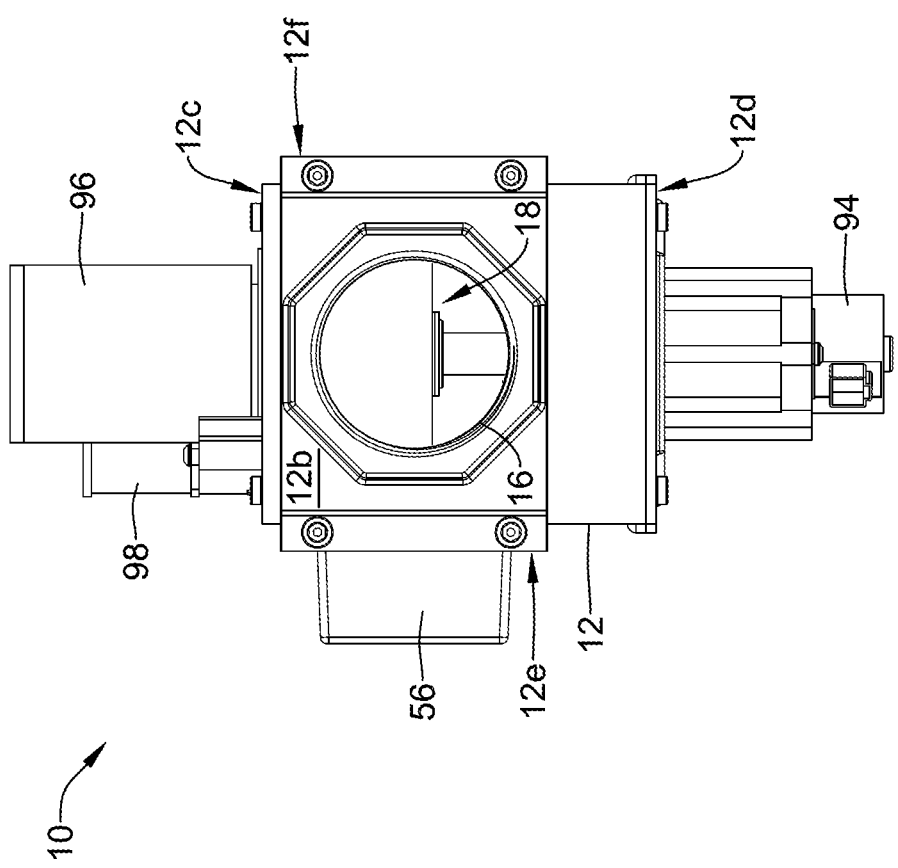
FIG. 5 is a schematic output side view of the illustrative fluid valve assembly of FIG. 1.
Figure 6:
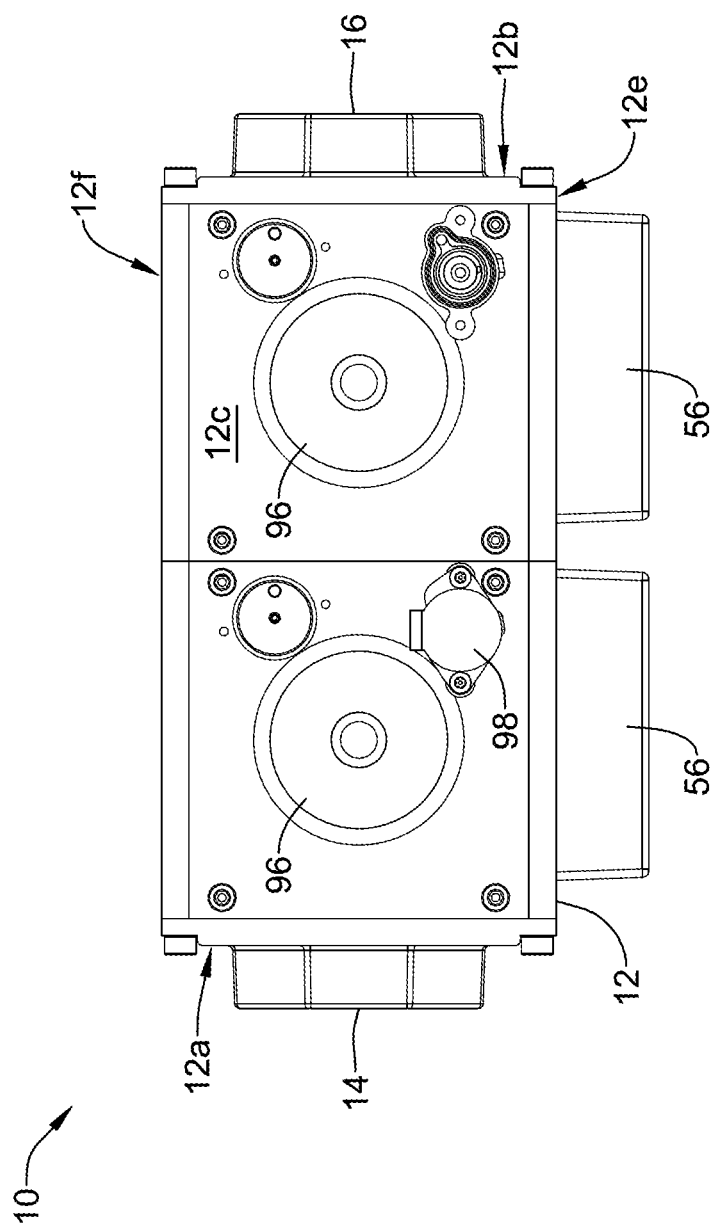
FIG. 6 is a schematic top view of the illustrative fluid valve assembly of FIG. 1.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The detailed description and drawings show several illustrative embodiments which are meant to be illustrative of the claimed disclosure.

Valve assemblies and/or valve assembly systems may include one or more valves within a valve body, two or more valves in series, two or more valves in parallel, and/or any other valve assembly configuration including at least one valve. The valve assemblies and valve assembly systems disclosed herein may be used in any application in which a valve may be utilized to assist in controlling a flow. Illustratively, valve assemblies and valve assembly systems may be utilized in control of fuel to a combustion device/system, flows in irrigation systems, flows for commercial and home appliances, and/or other applications.

In one example, valve assemblies may be used with combustion appliances. Combustion appliances may be used to provide comfort (e.g., room heating in commercial buildings, etc.) and/or to process heat (e.g., in industrial sectors and other sectors). Because combustion appliances are a key portion of any residential or industrial system, downtime due to an unexpected failure in a combustion appliance system may be costly. Thus, preventive maintenance that can be planned based on the health of the combustion appliance system and before a combustion appliance fails may be preferred because it may eliminate unexpected failures and/or minimize the impact of downtime on the combustion appliance system. Downtime may be optimized if the maintenance of the combustion appliance system is planned based on actual real time system health indicators, rather than planning maintenance in fixed time intervals and/or a pre-set schedule. Combustion appliance system components often do not have an ability to monitor the health of the combustion appliance (or components thereof) and thus, cannot provide data relevant for preventive maintenance planning.

A valve with electronics and one or more sets of sensors may be capable of monitoring its health by observing various variable or parameters (e.g., diagnostic parameters) indicative of one or more valve status and/or valve condition. Such variables and/or parameters may include, but are not limited to, total number of cycles of the valve (e.g., for ON-OFF valves), totalized repositioning of a valve (e.g., for modulating valves), fluid pressure, temperature, leakage level detected during a Valve Proving System test, leakage level detected during annual leak testing, position of a safety valve when "closed", particular gas levels (e.g., oxygen ($O_2$), carbon dioxide ($CO_2$), carbon monoxide (CO), and so on) in a connected flue or other location, fault history of the valve, time from the last maintenance, other variables and/or parameters, and/or any combination of the variables and/or parameters. Illustratively, as one or more monitored variables or parameters start to approach a threshold value (e.g., a threshold value set by a safety standard, a threshold level set by a user, etc.), the valve assembly 10 with or in communication with the one or more sensors may issue a warning to a user while maintaining operation of the combustion appliance system as long as the thresholds at a particular level are not exceeded.

In accordance with this disclosure, valves may be fitted to include and/or communicate with sensors, switches, and/or other mechanical or electronic devices to assist in monitoring and/or analyzing the operation of the valve and/or connected appliance or system. The sensors and/or switches may be of the electromechanical type, the electronic type, and/or of other types of sensors and/or switches, as desired. A key (e.g., an electronic key) and/or a password may be required to access data and/or settings of the sensors and/or switches.

In some cases, a valve assembly 10 may be configured to monitor and/or control various operations including, but not limited to, monitoring fluid flow and/or fluid consumption, electronic cycle counting, overpressure diagnostics, high pressure and low pressure detection, valve proving system tests, valve leakage tests, proof of valve closure tests, diagnostic communications, and/or any other suitable operation as desired.

As referred to above, valves may be added to fluid path systems supplying fuel and/or fluid to appliances (e.g., burners, etc.) or may be used individually or in different systems. In some instances, gas safety shutoff valves may be utilized as automatic redundant valves. Redundancy is achieved, and often times required by regulatory agencies, by placing at least two safety shutoff valves in series. The aforementioned redundant valves may be separate valves fitted together in the field and/or valves located together in a single valve body, these redundant valves are commonly referred to as double-block valves. Although safety shutoff valves are described in detail herein, the disclosed concepts may be applied to other valve assembly configurations, including valve assembly configurations with a single valve.

FIG. 1 is a schematic perspective view of an illustrative fluid (e.g., gas, liquid, etc.) valve assembly 10 for controlling fluid flow to a combustion appliance or other similar or different device. In the illustrative embodiment, the gas valve assembly 10 may include a valve body 12, which may generally be a six sided shape or may take on any other shape as desired, and may be formed as a single body or may be multiple pieces connected together. As shown, the valve body 12 may generally be a six-sided shape having a first end 12a, a second end 12b, a top 12c, a bottom 12d, a back 12e and a front 12f, as depicted in the various views of FIGS. 1-6. The terms top, bottom, back, front, left, and right are relative terms used merely to aid in discussing the drawings, and are not meant to be limiting in any manner.

Figure 7:
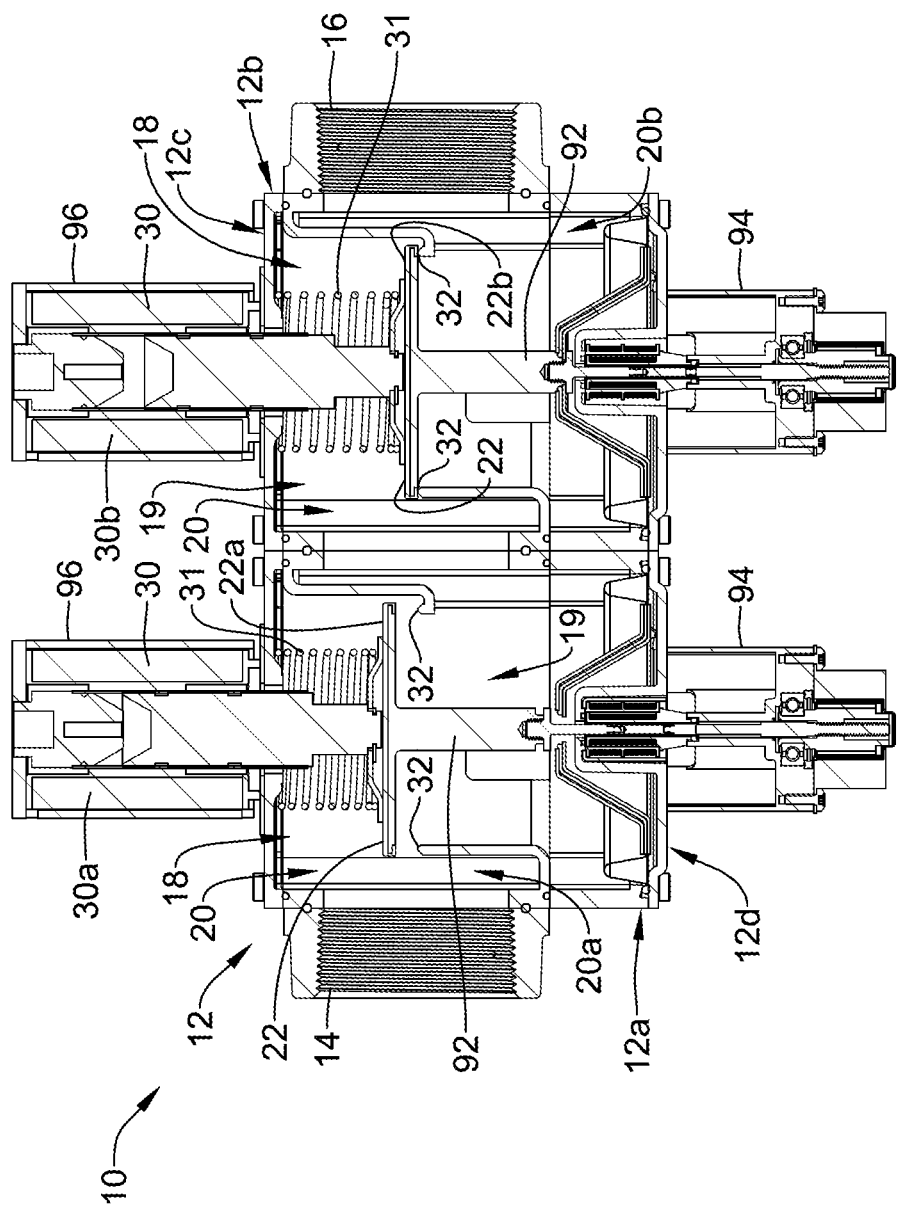
FIG. 7 is a cross-sectional view of the illustrative fluid valve assembly of FIG. 1, taken along line 7-7 of FIG. 4.
Figure 8:
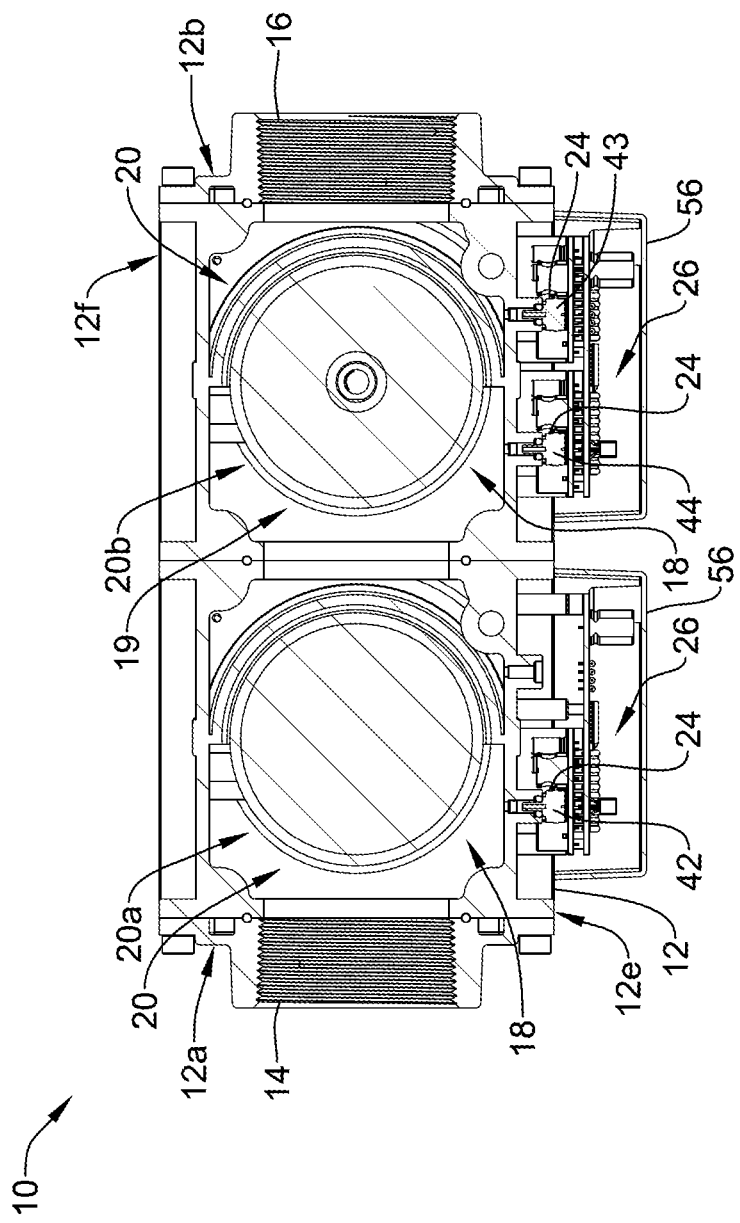
FIG. 8 is a cross-sectional view of the illustrative fluid valve assembly of FIG. 1, taken along line 8-8 of FIG. 2.

The illustrative valve body 12 includes an inlet port 14, an outlet port 16 and a fluid path or fluid channel 18 extending between the inlet port 14 and the outlet port 16. Further, valve body 12 may include one or more gas valve ports 20 (e.g., a first valve port 20a and a second valve port 20b, shown in FIGS. 7 and 8) positioned or situated in the fluid channel 18, one or more fuel or gas valve member(s) sometimes referred to as valve sealing member(s) 22 moveable within gas valve ports 20 (e.g., a first valve sealing member 22a within first valve port 20a and a second valve sealing member 22b within second valve port 20b, as shown in FIG. 7), one or more pressure sensor assemblies 24 (as shown in FIG. 8, for example), one or more position sensors 48, and/or one or more valve controllers 26 (as shown in FIG. 8, for example) affixed relative to or coupled to the valve body 12 and/or in electrical communication (e.g., through a wired or wireless connection) with the pressure sensor assemblies 24 and the position sensor(s) 48.

The valve assembly 10 may further include one or more actuators for operating moving parts therein. For example, the valve assembly 10 may have actuators including, but not limited to, one or more stepper motors 94 (shown as extending downward from bottom 12d of valve body 12 in FIG. 1), one or more solenoids 96 (shown as extending upward from top 12c of valve body 12 in FIG. 1), and one or more servo valves 98 (a servo valve 98 is shown as extending upward from top 12c of valve body 12 in FIG. 1-3, where a second servo valve has been omitted), where the servo valve 98 may be a 3-way auto-servo valve or may be any other type of servo valve. Other actuators may be utilized, as desired.

In one illustrative embodiment, the one or more solenoids 96 may control whether the one or more gas valve ports 20 are open or closed. The one or more stepper motors 94 may determine the opening size of the gas valve ports 20 when the corresponding gas valve sealing member 22 is opened by the corresponding solenoid 96. Of course, the one or more stepper motors 94 may not be provided when, for example, the valve assembly 10 is not a "modulating" valve that allows more than one selectable flow rate to flow through the valve when the valve is open.

As shown, the valve body 12 may include one or more sensors and electronics compartments 56, which in the illustrative embodiment, extend from back side 12e as depicted in FIGS. 1, 2 and 4-6. The sensors and electronics compartments 56 may be coupled to or may be formed integrally with the valve body 12, and may enclose and/or contain at least a portion of the valve controllers 26, the pressure sensors assemblies 24, and/or the electronics required for operation of valve assembly 10 as described herein. Although the compartments 56 may be illustratively depicted as separate structures, the compartments 56 may be a single structure part of, extending from, and/or coupled to the valve body 12.

The one or more fluid valve ports 20 may include a first gas valve port 20a and a second gas valve port 20b situated along and/or in communication with the fluid channel 18. This is a double-block valve design. Within each gas valve port 20, a gas valve sealing member 22 may be situated in fluid channel 18 and may be positioned (e.g., concentrically or otherwise) about an axis, rotatable about the axis, longitudinally and axially translatable, rotationally translatable, and/or otherwise selectively movable between a first position (e.g., an open or closed position) and a second position (e.g., a closed or open position) within the corresponding valve port 20. Movement of the valve sealing member 22 may open and close the valve port 20.

It is contemplated that valve sealing member 22 may include one or more of a valve disk 91, a valve stem 92 and/or valve seal 93 for sealing against a valve seat 32 situated in fluid channel 18, as best seen in FIGS. 14-17, and/or other similar or dissimilar components facilitating a seal. Alternatively, or in addition, valve sealing member 22 may include structural features and/or components of a gate valve, a disk-on-seat valve, a ball valve, a butterfly valve and/or any other type of valve configured to operate from a closed position to an open position and back to a closed position. An open position of a valve sealing member 22 may be any position that allows fluid to flow through the respective gas valve port 20 in which the valve sealing member 22 is situated, and a closed position may be when the valve sealing member 22 forms at least a partial seal at the respective valve port 20, such as shown in FIG. 7. Valve sealing member 22 may be operated through any technique. For example, valve sealing member 22 may be operated through utilizing a spring 31, an actuator 30 to effect movement against the spring 31, and in some cases a position sensor 48 to sense a position of the valve sealing member 22.

Valve actuator(s) 30 may be any type of actuator configured to operate the valve sealing member 22 by actuating valve sealing member 22 from the closed position to an open position and then back to the closed position during each of a plurality of operation cycles during a lifetime of the gas valve assembly 10 and/or of the actuator 30. In some cases, the valve actuator 30 may be a solenoid actuator (e.g., a first valve actuator 30a and a second valve actuator 30b, as seen in FIG. 7), a hydraulic actuator, magnetic actuators, electric motors, pneumatic actuators, and/or other similar or different types of actuators, as desired. In the example shown, the valve actuators 30a, 30b may be configured to selectively move valves or valve sealing members 22a, 22b of valve ports 20a, 20b between a closed position, which closes the fluid channel 18 between the inlet port 14 and the outlet port 16 of the valve body 12, and an open position. As discussed, the gas valve assembly 10 of FIGS. 1-8 is an example of a gas safety shutoff valve, or double-block valve. In some cases, however, it is contemplated that the gas valve assembly 10 may have a single valve sealing member 22a, or three or more valve sealing members 22 in series or parallel, as desired.

In some cases, the valve assembly 10 may include a characterized port defined between the inlet port 14 and the outlet port 16. A characterized port may be any port (e.g., a fluid valve port 20 or other port or restriction through which the fluid channel 18 may travel) at or across which an analysis may be performed on a fluid flowing therethrough. For example, if a flow resistance of a valve port 20 is known over a range of travel of the valve sealing member 22, the one of the one or more gas valve ports 20 may be considered the characterized port. As such, and in some cases, the characterized port may be a port 20 having the valve sealing member 22 configured to be in an open position and in a closed position. Alternatively, or in addition, a characterized port may not correspond to the gas valve port 20 having the valve sealing member 22. Rather, the characterized port may be any constriction or feature across which a pressure drop may be measured and/or a flow rate may be determined.

Characterized ports may be characterized at various flow rates to identify a relationship between a pressure drop across the characterized port and the flow rate through the fluid channel 18. In some cases, the pressure drop may be measured directly with one or more pressure sensors 42, 43, 44, and/or 38. In other cases, the pressure drop may be inferred from, for example, the current position of the valve member(s). These are just some examples. In some cases, the relationship may be stored in a memory 37, such as a RAM, ROM, EEPROM, other volatile or non-volatile memory, or any other suitable memory of the gas valve assembly 10, but this is not required.

Figure 9:
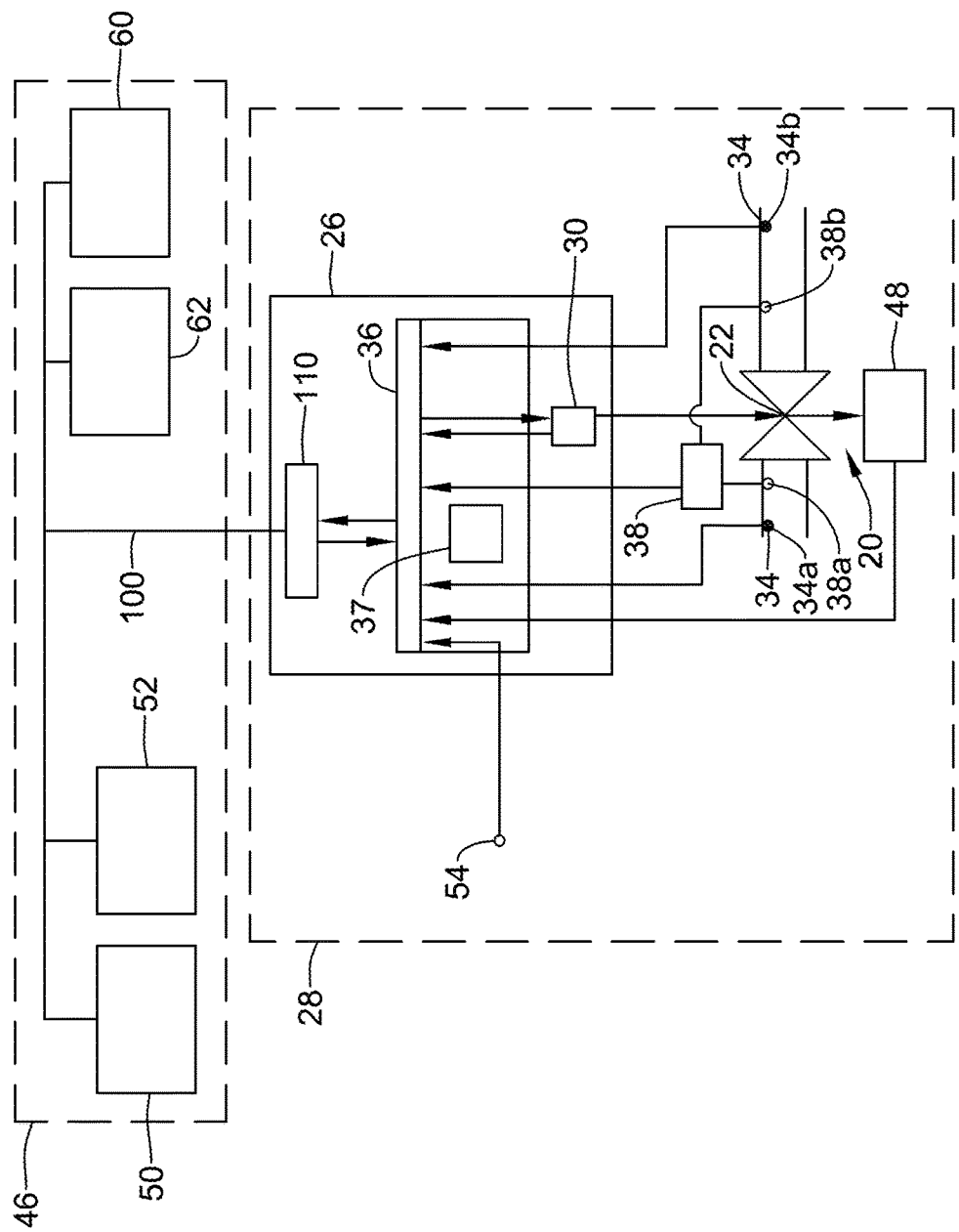
FIG. 9 is a schematic diagram showing an illustrative fluid valve assembly in communication with a building control system and an appliance control system, where the fluid valve assembly includes a differential pressure sensor connect to a valve controller.
Figure 10:
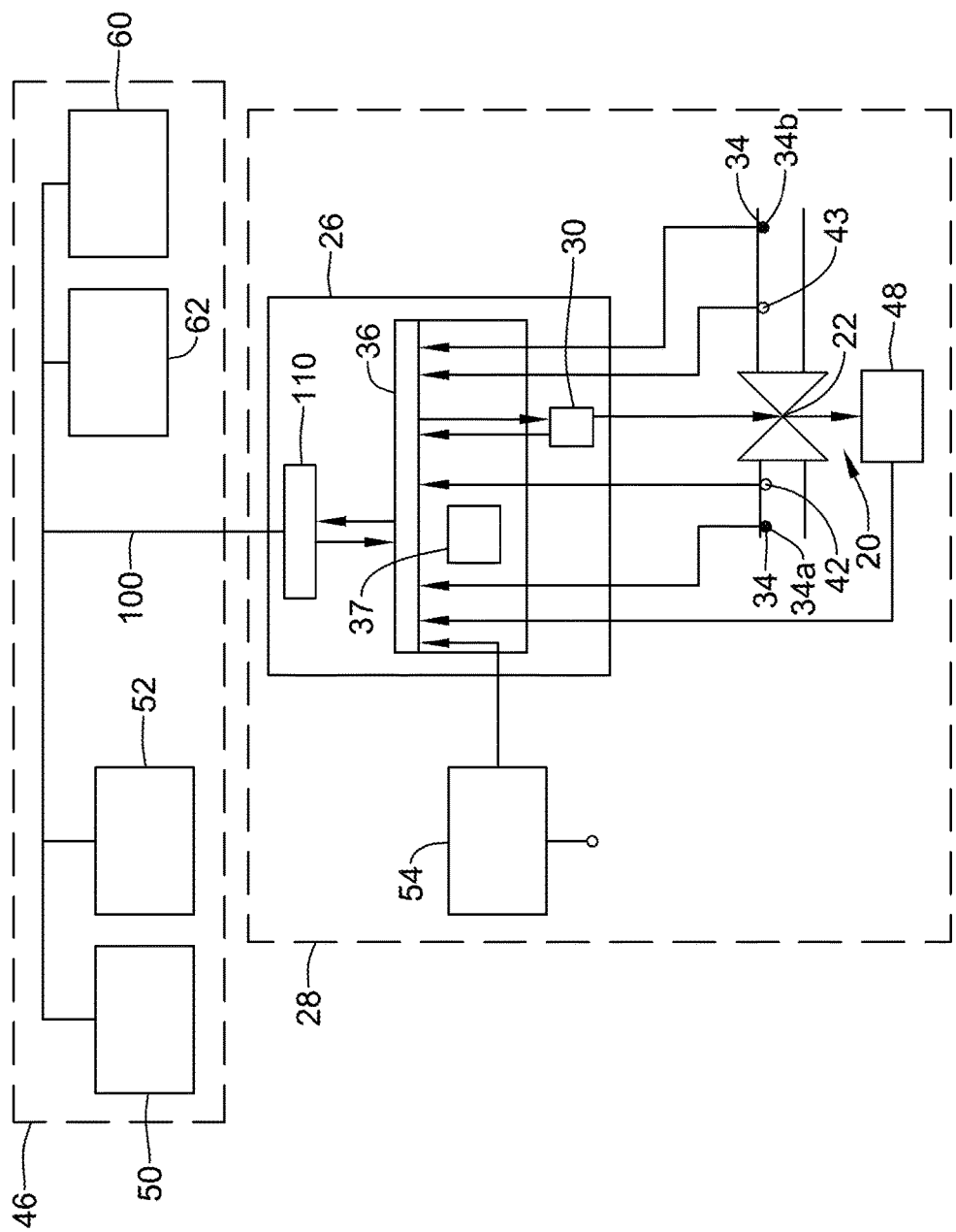
FIG. 10 is a schematic diagram showing an illustrative fluid valve assembly in communication with a building control system and an appliance control system, where the fluid valve assembly includes multiple pressure sensors connected to a valve controller.

In some cases, the gas valve assembly 10 may include a flow module 28 for sensing one or more parameters of a fluid flowing through fluid channel 18, and in some instances, determining a measure related to a gas flow rate of the fluid flowing through the fluid channel 18. The flow module 28 may include a pressure block or pressure sensor assembly 24, a temperature sensor 34, a valve member position sensor 48 and/or a valve controller 26, among other assemblies, sensors, and/or systems for sensing, monitoring, and/or analyzing parameters of a fluid flowing through the fluid channel 18, such as can be seen in FIGS. 9 and 10.

It is contemplated that the flow module 28 may utilize any type of sensor to facilitate determining a measure related to a flow rate of a fluid through fluid channel 18, such as a pressure sensor, a flow sensor, a valve position sensor, a temperature sensor, a current sensor, a gas sensor, an oxygen sensor, a CO sensor, a $CO_2$ sensor, and/or any other type of sensor, as desired. In one example, the flow module 28, which in some cases may be part of a valve controller 26, may be configured to monitor a differential pressure across a characterized port, and in some cases, a position of one or more valve sealing members 22 of the gas valve assembly 10. The information from monitoring may be utilized by the flow module 28 to determine and/or monitor the flow rate of fluid passing through the fluid channel 18. For example, the flow module 28 may determine a measure that is related to a gas flow rate through the fluid channel 18 based, at least in part, on the measure that is related to the pressure drop across the characterized port along with the pre-stored relationship in the memory 37. In some cases, the current position of one or more valve sealing members 22 of the gas valve assembly 10 may also be taken into account (e.g. is the valve 30% open, 50% open or 75% open).

In some instances, the flow module 28 may be configured to output the flow rate of fluid passing through the fluid channel 18 to a display or a remote device. In some cases, the flow module 28 may maintain a cumulative gas flow amount passing through the fluid channel 18 (e.g. over a time period), if desired. The measure related to a gas flow may include, but is not limited to, a measure of fuel consumption by a device or appliance that is connected to an outlet port 16 of the gas valve assembly 10.

It is contemplated that the valve controller or valve control block 26 (see, FIG. 8-10) may be physically secured or coupled to, or secured or coupled relative to, the valve body 12. The valve controller 26 may be configured to control and/or monitor a position or state (e.g., an open position and a closed position) of the valve sealing members 22 of the valve ports 20 and/or to perform other functions and analyses, as desired. In some cases, the valve control block 26 may be configured to close or open the gas valve member(s) or valve sealing member(s) 22 on its own volition, in response to control signals from other systems (e.g., a system level or central building control), and/or in response to received measures related to sensed pressures upstream, intermediate, and/or downstream of the characterized valve port(s), measures related to a sensed differential pressure across the characterized valve port(s), measures related to temperature sensed upstream, intermediate, and/or downstream of the characterized valve port(s), and/or in response to other measures, as desired.

The memory 37, which in some cases may be part of or in communication with the valve controller 26, may be configured to include system settings and record data related to sensed pressures, sensed differential pressures, sensed temperatures, and/or other measures. The valve controller 26 may access these settings and this data, and in some cases, communicate (e.g., through a wired or wireless communication link 100) the data and/or analyses of the data to other systems (e.g., a system level or central building control) as seen in FIGS. 9 and 10. The memory 37 and/or other memory may be programmed and/or developed to contain software to affect one or more of the configurations described herein.

In some instances, the valve controller 26 may be considered a portion of the flow module 28, the flow module 28 may be considered part of the valve controller 26, or the flow module 28 and valve controller 26 may be considered separate systems or devices. Illustratively, the valve controller 26 may be coupled relative to the valve body 12 and one or more gas valve ports 20, where the valve controller 26 may be configured to control a position (e.g., open or closed positions, including various open positions) of the valve sealing member 22 within the valve port 20. In some cases, the valve controller 26 may be coupled to and/or be in communication with local sensors including, but not limited to the pressure sensor assembly 24 (e.g., used for Low Gas/High Gas pressure limit functions, Valve Proving System tests, etc.), a flow sensor (e.g., for measuring gas consumption, etc.), a temperature sensor, 34 (e.g., to monitor temperature of a key component such as an actuator or other component, etc.), a position sensor 48, a current draw sensor (e.g., for sensing the current draw of an actuator or the entire system, etc.), a gas sensor, an oxygen sensor, a carbon monoxide (CO) sensor, a carbon dioxide ($CO_2$) sensor, a cycle sensor and/or cycle counter, timers (e.g., to measure an amount of time to open the valve and/or close the valve), and/or other sensors and assemblies, as desired.

The valve controller 26 may include or may be in communication with one or more remote sensor inputs for receiving one or more sensed parameters form one or more remotely located sensors located outside of the valve body 12, the valve ports 20, and/or valve actuators 30. Illustratively, the one or more remote sensors may include, but are not limited to, one or more of a pressure sensor, a flow sensor, a temperature sensor, a position sensor, a current draw sensor, a gas sensor, an oxygen sensor, a carbon monoxide (CO) sensor, a carbon dioxide ($CO_2$) sensor, a cycle sensor and/or cycle counter, and/or one or more other remote sensors.

In the illustrative embodiment of FIG. 8, the valve controller 26 may be configured to monitor a differential pressure across a characterized port. In some instances, the valve controller 26 may monitor a differential pressure across the fluid valve port 20 and/or monitor a measure related to a pressure upstream of a fluid valve port 20 (e.g., first valve port 20*a*) and/or a measure related to a pressure downstream of a fluid valve port 20 (e.g., second valve port 20*b*). The valve controller 26 may also be configured to monitor an axial position of the valve sealing member 22 in the valve port 20 (e.g., see FIGS. 14-17). As a result, the valve controller 26 may determine a flow rate of fluid passing through the characterized port, where the valve controller 26 may determine the flow rate (and sometimes fluid consumption) based, at least in part, on the monitored differential pressure and/or monitored upstream and downstream pressures in conjunction with a pre-characterized relationship between the pressure drop across the characterized port and the flow rate. In some cases, the monitored axial positioning of the valve sealing member 22 may also be taken into account, particularly when the valve sealing member 22 may assume one or more intermediate open positions between the fully closed and fully opened positions. When so provided, the pre-characterized relationship between the pressure drop across the characterized port and the flow rate may depend on the current axial positioning of valve sealing member 22.

In some instances, the valve controller 26 may include a determining block, which may include a microcontroller 36 or the like, which may include or be in communication with a memory 37, such as a non-volatile memory. Alternatively, or in addition, the determining block (e.g. microcontroller 36) may be coupled to or may be configured within the valve control block or valve controller 26. The determining block may be configured to store and/or monitor one or more parameters, which may be used when determining a measure that is related to a fluid flow rate through the fluid channel 18. The determining block (e.g. microcontroller 36) may be configured to use the stored and/or monitored parameters (e.g. the relationship between a pressure drop across a characterized port and the flow rate through the fluid channel 18) stored in the memory 37 to help determine a measure that is related to a fluid flow rate through the fluid path or the fluid channel 18.

Illustratively, the determining block (e.g. microcontroller 36) may be configured to determine and/or monitor a measure (e.g., a flow rate of fluid passing through the characterized port or other similar or different measure, as desired) based, at least in part, on stored and/or monitored measures including, but not limited to, measures related to pressure drop across a characterized valve port or other pressure related measures upstream and downstream of the characterized valve port(s), a temperature of the fluid flowing through the fluid channel 18, and/or a measure related to a current position of the valve sealing member 22 at the gas valve port 20 or the size of an opening at the characterized port. In one example, a determining block (e.g. microcontroller 36) may include non-volatile memory that is configured to store opening curves of the valve assembly 10, where the opening curves may characterize, at least in part, a flow rate as a function of a sensed axial position of valve sealing member 22, and a sensed differential pressure across a characterized valve port 20 or an otherwise determined pressure at or adjacent a characterized valve port 20 (e.g., knowing a set-point of an upstream pneumatic pressure reducing valve (PRV), as the set-point pressure of the PRV may be substantially equal to the pressure at an inlet of the characterized valve port), and may facilitate determining an instantaneous and/or cumulative fluid (e.g., fuel) flow in the fluid channel 18 and/or consumption by an appliance in fluid communication with the valve assembly 10.

It is contemplated that the determining block (e.g. microcontroller 36) may continuously or non-continuously control, store, and/or monitor a position (e.g., an axial or rotary position or open/closed state or other position) of the valve sealing member 22 within the valve port 20, monitor a differential pressure across the characterized port, and/or monitor a temperature upstream and/or downstream of the characterized port. In addition, the microcontroller 36 may continuously or non-continuously determine the flow rate of the fluid passing through the characterized port, where the microcontroller 36 may be configured to record in its memory or in another location, an instantaneous flow rate of fluid flowing through the characterized port, a cumulative flow volume, and/or a determined instantaneous or cumulative (e.g., total) fluid consumption based on the positions of the valve sealing member(s) 22 and determined flow rates at an instant of time or over a specified or desired time period. In addition, the determining block (e.g. microcontroller 36) may be configured to report out the instantaneous flow rate, cumulative flow volume, total or cumulative fluid consumption over a given time period, and/or other determination and/or valve assembly conditions. The determining block (e.g. microcontroller 36) may report the instantaneous flow rate, cumulative flow rate, total or cumulative consumption of the fluid flowing through the characterized port, and/or other determination and/or valve assembly conditions to a system display 52 of an overall system controller 50 (e.g., a building/industrial automation system (BAS/IAS) controller), an appliance display 62 of an appliance/system controller 60 where the appliance may be configured to receive the flowing fluid, a display adjacent gas valve assembly 10, or any other display 77, device, controller and/or memory, as desired.

In some instances, the valve controller 26 may include or be in communication with a valve actuator 30, which in conjunction with the stepper motor 94 or other device is configured to position the valve sealing member 22 in the valve port 20. The valve actuator 30 and/or the stepper motor 94 may be in communication with the microcontroller 36 of the valve controller 26, and the microcontroller 36 may be configured to control, monitor, and/or record the position (e.g., axial position, radial position, etc.) of the valve sealing member 22 within the valve port 20 through the valve actuator 30 (e.g., the valve actuator 30 may be configured to effect the locking (e.g., the valve actuator 30 OFF) or the unlocking (e.g., the valve actuator 30 ON) of the valve sealing member 22 in a particular position) and the stepper motor 94 (e.g., stepper motor 94 may be configured to adjust the position of the valve sealing member 22 when it is not locked in a particular position), or through only the stepper motor 94. Alternatively, or in addition, the microcontroller 36 may be configured to monitor and record the position of the valve sealing member 22 within the valve port 20 through a connection with a position sensor 48 or through other means.

The valve controller 26 may include an I/O or communications interface 110 with a communication protocol for transmitting data to and/or otherwise communicating with one or more remote device(s) that may be located remotely from valve assembly 10 (e.g., a combustion appliance including controller 60 located remotely from valve assembly 10, a remote display 77, an electronic access tool or key 79, and/or other remote devices). The communications interface 110 may be a wired or wireless communication interface, where the wired or wireless communication interface 110 may be configured to be compatible with a predetermined communication bus protocol or other communication protocol. A wired link may be low voltage (e.g. 24V, 5V, 3V, etc.), which may reduce certain issues related to line-voltage wiring schemes. Illustratively, communications interface 110, using the predetermined communication bus protocol or other communication protocol, may be configured to output and/or communicate one or more valve conditions, one or more measures related to valve conditions, one or more conditions related to a fluid flow through the fluid channel 18, and/or one or more diagnostic parameters, conditions or events, to a device located adjacent or remote from the valve assembly 10.

In an illustrative example of monitoring parameters sensed by sensors of or in communication with a valve assembly, the microcontroller 36 of the valve controller 26 may continuously or non-continuously monitor and record the position (e.g., axial position, radial position, etc.) of valve sealing member 22 within the valve port 20 through the valve actuator 30 and the stepper motor 94, and the microcontroller 36 may indicate the sensed and/or monitored position of the valve sealing member 22 within the valve port 20 as a prescribed position of valve sealing member 22. The prescribed position of the valve sealing member 22 may be the position at which the valve sealing member 22 was and/or is to be located, whereas a position of the valve sealing member 22 sensed by the position sensor system 48 may be considered an actual position of the valve sealing member 22 within the valve port 20.

In the example, the valve controller 26 may be configured to perform electronic operational cycle counting or may include an electronic counter configured to count each operational valve cycle of the valve sealing members 22 during, for example, the lifetime of the gas valve assembly 10 or during some other time period. In some cases, the microprocessor 36 of the valve controller 26 may be configured to monitor a total number of operational cycles (e.g., the number of times the fuel valve sealing members 22 are operated from a closed position to an open position and back to a closed position) of the valve ports 20 and measures related thereto. In some cases, the microprocessor 36 may store such data in a non-volatile memory, such as the memory 37, sometimes in a tamper proof manner, for record keeping and/or other purposes. The microprocessor 36 may monitor the number of cycles of the valve sealing members 22 in one or more of several different manners. For example, the microprocessor 36 may monitor the number of cycles of the valve sealing members 22 by monitoring the number of times the first main valve switch 72 and/or the second main valve switch 74 are powered or, where one or more control signals may be provided to the fuel valve actuator(s) 30 controlling when the fuel valve actuator(s) 30 selectively moves (e.g., opens or closes) the valve sealing member(s) 22, the microprocessor 36 may monitor the one or more control signals.

Figure 11:
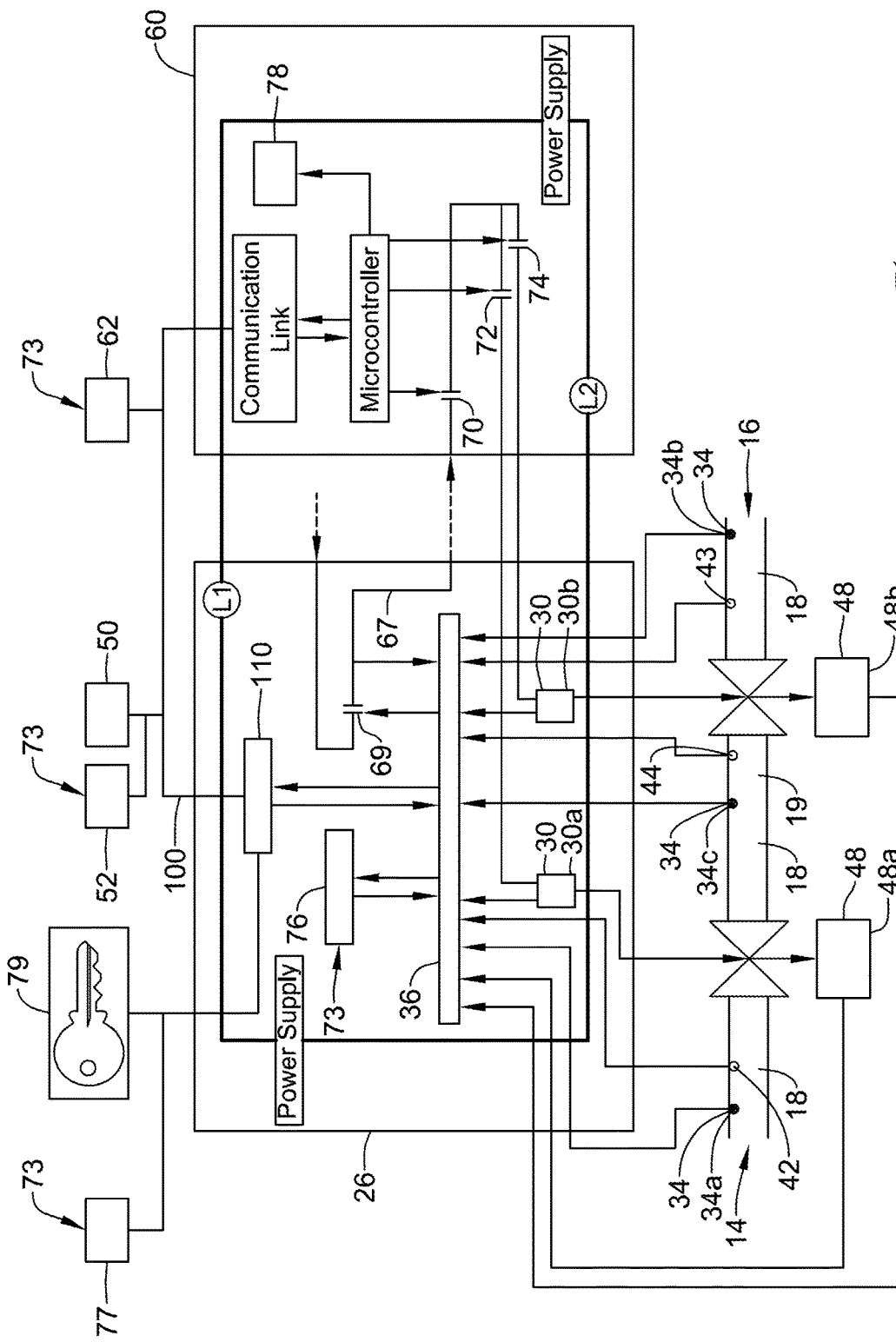
FIG. 11 is a schematic diagram showing an illustrative schematic of a low gas pressure/high gas pressure limit control.
Figure 12:
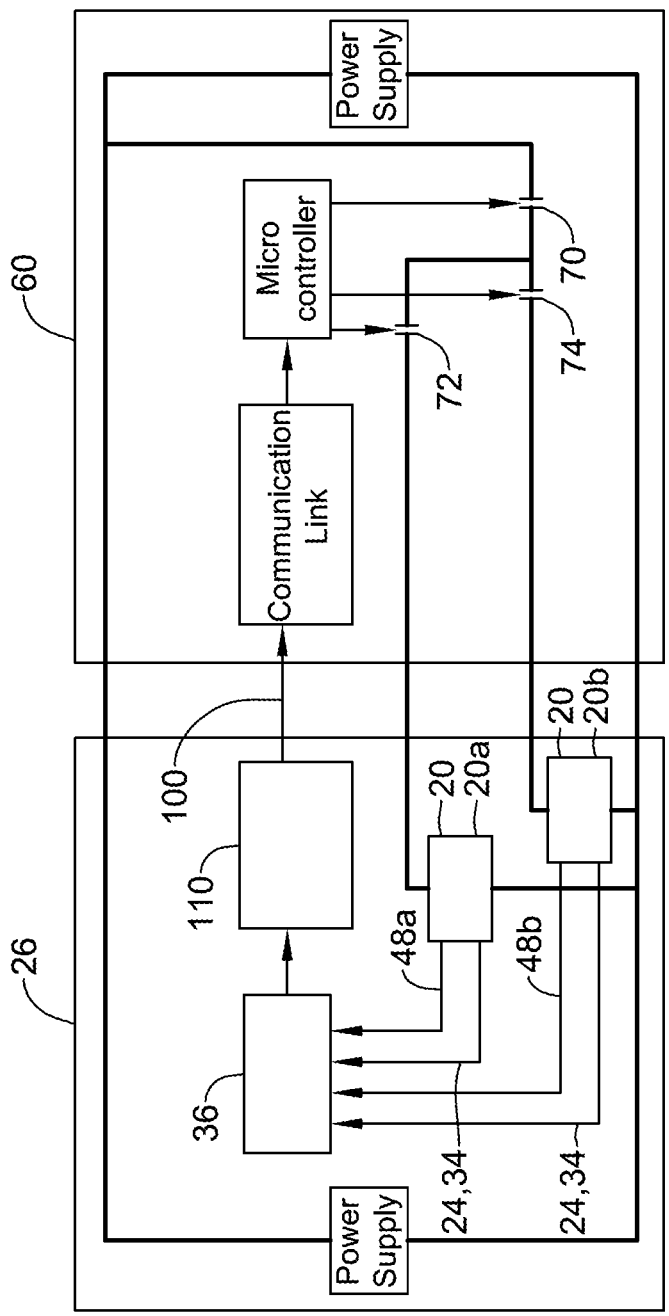
FIG. 12 is a schematic diagram showing an illustrative schematic valve control and combustion appliance control, where the controls are connected via a communication link.

The valve controller 26, in some cases, may monitor the main valve switches 72, 74 by receiving signals directly from a device located remotely from the valve assembly 10 on which the main valve switches 72, 74 may be located (e.g. see FIGS. 11-12). Switches ((main valve switches 72, 74 and safety switch 70 (discussed below)) may be any mechanism capable of performing a switching function including, but not limited to, relays, transistors and/or other solid state switches and circuit devices and/or other switches. The valve controller 26 may include an electrical port, sometimes separate from a communications interface 110 (discussed below), for receiving one or more control signals from the device located remotely from valve assembly 10. The one or more control signals received via the electrical port may include, but are not limited to: a first valve port 20a control signal that, at least in part, may control the position of the first valve sealing member 22a via the first valve actuator 30a, and a second valve port 20b control signal that, at least in part, may control the position of the second valve sealing member 22b via the second valve actuator 30b.

As an alternative to monitoring control signals, or in addition, microprocessor 36 may monitor the number of cycles of valve sealing members 22 by monitoring data from a position sensor 48. For example, microprocessor 36 of valve controller 26 may monitor position sensor 48 and record the number of times valve sealing members 22 are in an open position after being in a closed position and/or the number of times valve sealing members 22 are in a closed position after being in an open position and/or the number of times valve sealing members are operated from a close position to an open position and back to a closed position. These are just some examples. Further, if valve controller 26 is operating valve sealing members 22, valve controller 26 may monitor the number of operational cycles by counting its own control signals sent to valve actuators 30 and/or stepper motors 94.

The non-volatile memory, which may maintain and/or store the number of operational valve cycles, may be positioned directly on, or packaged with, valve body 12 (e.g., on or within memory of microcontroller 36) and/or may be accessible by the valve controller 26. Such storage, placement, and/or packaging of valve cycle data may allow for replacement of components in the overall system (e.g., an appliance control 60, etc.) without losing the valve cycle data. In an illustrative instance, the valve cycle data may be securely stored, such that it may not be tampered with. For example, the valve cycle data may be stored in the memory 37 (e.g., non-volatile memory or other memory) of the valve controller 26 and the valve cycle data and/or other valve assembly 10 data may be password protected.

The microcontroller 36 of valve assembly 10 may be configured to compare a count of a total number of operational cycles of valve sealing members 22 to a threshold number of operational cycles. In an instance where the counted number of operational cycles of the valve sealing member(s) 22t approaches, meets, or exceeds the threshold number of cycles, the microcontroller 36 may initiate a warning and/or request a switch 69 in a limit string 67 to open and thus, remove or cut power to the valve switches 72, 74 and fuel valve actuator(s) 30. Alternatively, or in addition, the microcontroller 36 may send a signal to initiate an alarm and/or put the system in a safety lockout, or the microcontroller 36 may be configured to take other action as desired. Illustratively, the microcontroller 36 may be configured to prevent fuel valve actuator(s) 30 from allowing the valve sealing member(s) 22 to open after the total number of operational cycles meets and/or exceeds the threshold number of operational cycles. In some instances, the threshold number of cycles may be related to the number of cycles for which the valve assembly 10 is rated (e.g., a maximum number of cycles before failures might be expected, etc.) or related to any other benchmark value. In addition, the microcontroller 36 may be configured to perform other diagnostics based on analyzing captured operational cycle data, where the other diagnostics may include number of cycles, time duration of cycles, and similar or different diagnostics, as desired.

In addition to the communication interface 110 being configured to output information to a device located adjacent or remote from the valve assembly 10, the communication interface 110 may be configured to receive one or more inputs from the remote device or an adjacently positioned device. Illustrative inputs may include, but are not limited to: an acknowledgement of reception of one or more of the valve conditions, a user setting, a system setting, a valve command, and/or other similar or dissimilar input.

In some instances, the valve controller 26 may communicate through the I/O interface or communication interface 110 with a remotely located output block 46, where the output block 46 may display and/or output a determined measure related to fluid flow rate through the fluid channel 18, sometimes along with other data, information and controls sent from the valve controller 26 (see, for example, FIGS. 9 and 10). The output block 46 may include a display and/or other remote systems, and the microcontroller 36 may be configured to send measures to a device control system 60 or building automation system or overall system controller 50 of the output block 46 for further monitoring and/or analysis. As discussed, the I/O interface may include a wired and/or wireless interface between the valve controller 26 (e.g., microcontroller 36) and the output block 46 systems (e.g., the building automation system or the overall system controller 50, the combustion appliance management system 60, handheld device, laptop computer, smart phone, etc.), where the connection between the valve controller 26 may or may not be made with the communication link 100 (e.g., the communication link 100 could, but need not be, the one and only one communication link).

In an illustrative operation, the valve controller 26 may be utilized in a method for communicating information between the valve assembly 10 and a combustion appliance controller 60, where the combustion appliance controller 60 may be associated with a combustion appliance (e.g., a device separate from, and possibly remotely relative to valve assembly 10) for which the valve assembly 10 may control a flow of fuel. The operation may include sensing, with one or more sensor (e.g., pressure sensor assembly 24), one or more sensed parameters within the fluid channel 18 of the valve assembly 10. The sensed parameter may be stored in the memory 37 (e.g., non-volatile memory or other memory) of the valve controller 26. The valve controller 26 may determine one or more valve conditions (e.g., a safety event condition or other valve condition) based on the one or more sensed parameters. For example, the valve controller 26 may compare one or more values related to the one or more sensed parameters (as discussed further below) to a threshold parameter to determine one or more valve conditions. If one or more valve conditions have been determined, the valve controller 26 may be configured to send information that may be related to the one or more determined valve conditions from valve assembly 10 to the combustion appliance controller 60 (or other controller or device) across a communication link or bus 100 connected to a communications interface 110.

In one example, upon receiving one or more determined valve conditions, such as a safety event condition, the combustion appliance controller 60 (or other controller or device) may be configured to open the safety switch 70, such that power to a valve control signal that is coupled to one or more valve actuators 30 is cut, thereby automatically closing one or more valve ports 20 (e.g., closing valve sealing member(s) 22 of valve port(s) 20). In some cases, the safety switch 70 may be controlled by an algorithm in the combustion appliance controller 60, where an output of the algorithm is affected by information passed via the communication link 100. Additionally, or in the alternative, other feedback signals may affect an output of the algorithm, where the other feedback signals may or may not be passed via the communication link 100 and may or may not originate from the valve assembly 10.

In other illustrative operations, a low gas pressure/high gas pressure event may be reported from the valve controller 26 to the combustion appliance controller 60. In response to receiving a reported low gas pressure/high gas pressure event, the combustion appliance controller 60 may be configured to open the safety switch 70. Further, in cases where a proof of closure event is reported to the combustion appliance controller 60 prior to ignition of the combustion appliance, an ignition sequence may not be started. In certain other instances where a Valve Proving System (VPS) sequence test is being performed, a combustion appliance controller 60 may use reported results of the VPS sequence test to make an evaluation. For example, if in the evaluation of the VPS test it were determined that a valve was leaking, the appliance controller 60 might be programmed to open safety switch 70, to initiate a safety lockout, to initiate an alarm, and/or to take any other similar or dissimilar measure.

In other scenarios, the valve assembly 10 may be used as a control valve and in that case, the valve controller 26 may send a signal to the combustion appliance controller 60 indicative of a valve position, and the combustion appliance controller 60 may respond accordingly. These other scenarios, for example, may be applied in parallel positioning system applications, low fire switch applications, auxiliary switch applications, etc. Additionally, it is contemplated that the valve controller 26 may interact with remote devices in other similar and dissimilar manners within the spirit of this disclosure.

The pressure block or pressure sensor assembly 24 may be included in the flow module 28, as seen in FIGS. 9 and 10, and/or the pressure sensor assembly 24 may be at least partially separate from the flow module 28. The pressure sensor assembly 24 may be configured to continuously or non-continuously sense pressure or a measure related to pressure upstream and/or downstream of a characterized port and/or along other portions of the fluid channel 18. Although the pressure sensor assembly 24 may additionally, or alternatively, include a mass or volume flow meter to measure a flow of fluid through the fluid channel 18, it has been contemplated that such meters may be more expensive and difficult to place within or outside the valve assembly 10; thus, a useful, relatively low cost alternative and/or additional solution may include placing the pressure sensors 38, 42, 43, 44 and/or other pressure sensors within, about and/or integrated in the valve body 12 of the valve assembly 10 to measure the fluid flow through the fluid channel 18, the pressures at the input and output ports, and/or other similar or different pressure related measures. The pressure sensors 38, 42, 43, 44 may include any type of pressure sensor element. For example, the pressure sensor element(s) may be MEMS (Micro Electro Mechanical Systems) pressure sensors elements or other similar or different pressure sensor elements such as an absolute pressure sense element, a gauge pressure sense element, or other pressure sense element as desired. Example sense elements may include, but are not limited to, those described in U.S. Pat. Nos. 7,503,221; 7,493,822; 7,216,547; 7,082,835; 6,923,069; 6,877,380, and U.S. patent application publications: 2010/0180688; 2010/0064818; 2010/00184324; 2007/0095144; and 2003/0167851, all of which are hereby incorporated by reference.

In some cases, the pressure sensor assembly 24 may include a differential pressure sensor 38 for measuring a differential pressure drop across a characterized valve port 20, or across a different characterized port, as seen in FIG. 9. A pressure sensor assembly 24 including a differential pressure sensor 38, may be exposed to both a first pressure 38a upstream of a characterized valve port and a second pressure 38b downstream of the characterized valve port. The differential pressure sensor 38 may send a measure related to the sensed differential pressure to the microcontroller 36 of the valve controller 26, as seen from the diagram of FIG. 9. The microcontroller 36 may be configured to monitor the differential pressure across the characterized port with the differential pressure measures sensed by the differential pressure sensor 38.

Alternatively, or in addition, an illustrative pressure sensor assembly 24 may include one or more first pressure sensors 42 upstream of a characterized valve port and one or more second pressure sensors 43 downstream of the characterized valve port, where the first and second pressure sensors 42, 43 may be in fluid communication with the fluid channel 18 and may be configured to sense one or more measures related to a pressure upstream and a pressure downstream, respectively, of the characterized valve port, as seen in FIG. 10. Where a second valve port (e.g., the second valve port 20b) may be positioned downstream of a first characterized valve port (e.g. the first valve port 20a) and forming an intermediate volume 19 between the first and second valve ports, the pressure sensor assembly 24 may include one or more third pressure sensors 44 in fluid communication with the intermediate volume 19, which may sense one or more measures related to a pressure in the intermediate volume 19. Where two characterized ports are utilized, the first pressure sensors 42 may be upstream of both characterized ports, second pressure sensors 43 may be downstream of both characterized ports, and the third pressure sensors 44 may be downstream from the first characterized port and upstream from the second characterized, but this is not required (e.g., first and second pressure sensors 42, 43 may be used to estimate the pressure drop across the valves). Additionally, or in the alternative, one or more differential pressure sensors 38 may be utilized to estimate the pressure drop across the first characterized port and/or the second characterized port. It is further contemplated that valve ports 20 may not be characterized ports.

The pressure sensors 42, 43, 44 may be configured to send each of the sensed measure(s) directly to the microcontroller 36. The microcontroller 36 may be configured to save the sensed measures and/or related information to the memory 37 (e.g., non-volatile memory or other memory), and may perform one or more analyses on the received sensed measures. For example, the microcontroller 36, which may be a portion of the flow module 28 and/or the valve controller 26, may determine a measure that is related to a fluid flow rate through the fluid path based, at least in part, on the received sensed measures related to pressure upstream of the characterized port and on the received sensed measures related to pressure downstream of the characterized port.

Where a valve assembly 10 includes one or more valve ports 20, the pressure sensor assembly 24 may include the first pressure sensor 42 positioned upstream of the first valve port 20a at or downstream of the inlet port 14, as seen in FIG. 11. In addition, or alternatively, the pressure sensor assembly 24 may include a second pressure sensor 43 positioned downstream of the second valve port 20b at or upstream from the outlet port 16. The valve assembly 10 may further include one or more third pressure sensors 44 downstream of the first valve port 20a and upstream of the second valve port 20b. The pressure sensors 42, 43, 44 may be configured to sense a pressure and/or a measure related to the pressure in the fluid channel 18, and to communicate the sensed measures to the valve controller 26, which is physically coupled to or positioned within the valve body 12. Where multiple pressure sensors 42, 43, 44 exist at or near one or more location (e.g., upstream of the valve ports 20, intermediate of the valve ports 20, downstream of the valve ports 20, etc.) along the fluid channel 18, at least one of the multiple pressure sensors may be configured to sense pressures over a pressure sub-range different from a sub-range over which at least one other of the multiple pressure sensors at the location may be configured to sense pressure, but this is not required. In some cases, and as shown in FIG. 8, the various pressure sensors may be mounted directly to a corresponding circuit board, such that when the circuit board is mounted to the valve body 12, the pressure sensor is in fluid communication with a corresponding fluid port in the valve body 12.

In some instances, such arrangements of pressure sensors 38, 42, 43, 44 within valve assembly 10, along with the connection between the valve controller 26 and the pressure sensors 38, 42, 43, 44 may be used to emulate functions of high gas pressure (HGP) and low gas pressure (LGP) switches, which traditionally require wires and further housings extending to and from and/or attached to the valve body 12. When the electronics and elements of the valve assembly 10 are configured to emulate LGP/HGP switches, gas-valve wiring connections and interactions may be at least partially avoided, eliminated or simplified. In some instances, such configuration of the valve controller 26 and the pressure sensors 38, 42, 43, 44 may reduce manual operations (e.g., manually adjusting a mechanical spring or other device of conventional high gas pressure (HGP) and low gas pressure (LGP) switches), and allow for a more precise fitting with the electronics of the valve assembly 10.

In some cases, the pressure sensor assembly 24 may include one or more absolute pressure sensors 54 in communication with the microcontroller 36. The absolute pressure sensor 54 may sense an atmospheric pressure adjacent the gas valve assembly 10, and may be configured to communicate and transfer data related to the sensed atmospheric pressure to the microcontroller 36. The microcontroller 36 may take into account the atmospheric pressure from the absolute pressure sensor 54 when determining the flow rate of fluid flowing through the characterized port and/or an estimate of fuel consumption by an attached appliance and/or when determining threshold values. Other sensors may be included in valve assembly 10, for example, one other type of sensor may be a barometric pressure sensor.

As discussed, the valve assembly 10 and the flow module 28 thereof may include temperature sensor(s) 34, as seen in FIGS. 9-11. The temperature sensor 34 may be positioned within the valve body 12 so as to be at least partially exposed to the fluid channel 18 and configured to sense a temperature of a fluid (e.g., gas or liquid) flowing through the fluid channel 18 and/or any other temperature in the fluid channel 18. The temperature sensor 34 may have a first temperature sensor 34a at least partially exposed to the fluid channel 18 upstream of a characterized valve port, and/or a second temperature sensor 34b at least partially exposed to the fluid channel 18 downstream of the characterized valve port, as seen in FIGS. 9 and 10. When there is a first valve port and a second valve port (e.g., valve ports 20a, 20b), there may be a third temperature sensor 34c in fluid communication with intermediate volume 19 between the first and second characterized valve ports, if desired. The sensed temperature measure may be used by flow module 28 to, for example, compensate, correct, or modify a determined measure (e.g., a density of a fluid) that is related to, for example, a fluid flow rate of fluid flowing through the fluid channel 18, which may help improve the accuracy of the flow rate calculation. In operation, the temperature sensor 34 (e.g., any or all of temperatures sensors 34a, 34b, 34c) may communicate a sensed temperature measure directly or indirectly to the valve controller 26 and/or the memory 37 (e.g., non-volatile memory or other memory) of the valve controller 26 (e.g., the memory in a microcontroller 36 or memory in another location) and/or the flow module 28. The valve controller 26 may, in turn, utilize the sensed temperature to help increase the accuracy of a determined flow rate of fluid passing through a characterized port and/or increase the accuracy of a calculated fluid and/or fuel consumption quantity, as desired, and store the calculated flow rate of fluid passing through a characterized port and/or the calculated fluid and/or fuel consumption quantity in the memory 37 (e.g., non-volatile memory or other memory). Additionally, or in the alternative, in some instances the pressure sensors 38, 42, 43, 44 may utilize built-in temperature sensors that are used to internally compensate the pressure sensor over the operating temperature range. In such instances, the temperature reading may be accessible at the pressure sensor output (e.g., a digital communication bus) or at another location.

The flow module 28 of valve assembly 10 may further include a position sensor system that may be configured to continuously or discontinuously sense at least one or more of an axial position, a rotary position, and/or a radial position, of the valve sealing member 22 within or about the fluid valve port 20. In some cases, the position sensor system may include more than one position sensors 48, such that each position sensor 48 may monitor a sub-range of a valve's total travel. Moreover, the position sensor system may be utilized as a proof of closure switch system. The position sensor(s) 48 of the position sensor system may be situated or positioned in valve body 12 at or about a valve port 20. For example, and in some instances, the position sensor(s) 48 may be fluidly isolated from the fluid channel 18 (e.g., fluidly isolated from the fluid channel 18 by the valve body 12), and radially spaced from an axis upon which a valve sealing member(s) 22 may axially and/or rotationally translate between a closed position and an open position, as seen in FIGS. 14-17.

An illustrative gas valve assembly 10 may include a first valve port 20a and a second valve port 20b (see FIG. 7), and a first position sensor 48a monitoring the first valve sealing member 22a and a second position sensor 48b monitoring the second valve sealing member 22b, where the position sensors 48a, 48b may be separate devices or may share an enclosure and/or other parts. In the illustrative instance, the first position sensor 48a may be fluidly isolated from the fluid channel 18 and radially spaced from a first axis of the first valve port 20a, and the second position sensor 48b may be fluidly isolated from the fluid channel 18 and radially spaced from a second axis of second valve port 20b (see FIGS. 14-17).

As discussed above, the position sensor 48 may be configured to detect a measure that is related to whether the valve sealing member 22 is in an open or closed position and/or a measure related to an intermediate position of the valve sealing member 22 within the fluid valve port 20. In one example, the position sensor(s) 48 may be configured to provide a proof of closure (POC) sensor(s) for the valve port(s) 20 (e.g., the first valve port 20a and/or the second valve port 20b).

Where the valve sealing member(s) 22 have a range of travel (e.g., rotationally and/or axially) within the valve port(s) 20, the position sensor(s) 48 may be configured to sense a current position of the valve sealing member(s) 22 anywhere along the range of travel of the valve sealing member(s) 22. The position sensor 48 may then send (e.g., through electronic or other communication) sensed positioning data of the measure related to the position of the valve sealing member 22 to the determining block and/or microcontroller 36 and/or the memory 37 (e.g., non-volatile memory or other memory) of the valve controller 26 and/or the flow module 28, where the microcontroller 36 may be configured to monitor the axial position of the valve sealing member 22 within the valve port 20 through the position sensor system 48.

Figure 13:
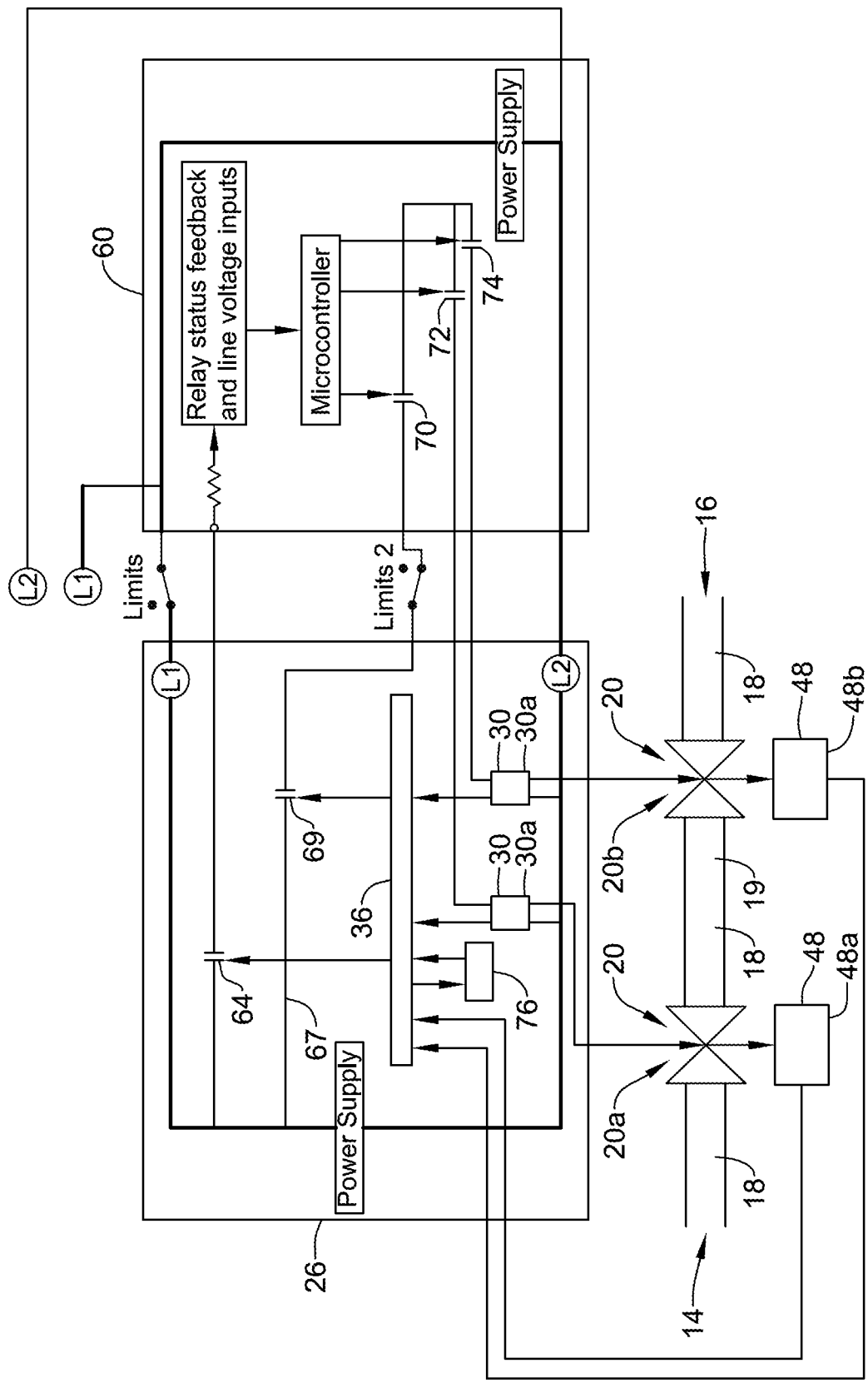
FIG. 13 is a schematic diagram showing an illustrative valve control and proof of closure system in conjunction with a combustion appliance.

In some instances, the valve controller 26 may include an electronic circuit board and/or a wired or wireless communication link 100 may facilitate communication between the position sensor(s) 48 and the electronic circuit board or other device of the valve controller 26. The valve controller 26 may be configured to further pass on positioning information to remote devices through communication lines (e.g., the communication link 100) and/or display positioning data of the valve sealing member 22 on one or more displays 76 attached to the valve assembly 10 and/or the remote devices, as seen in FIG. 13. The valve controller 26 may indicate a closed or open position of the valve sealing member 22 or a degree (e.g., 10%, 20%, 30%, etc.) of an opening of the valve sealing member 22 with one or more visual indicators on or comprising the display(s) 76, as seen in FIG. 13, such as one or more light emitting diodes (LEDs) acting as a visual indication of a valve state and/or position, liquid crystal displays (LCDs), a touch screen, other user interfaces and/or any other display interfacing with or displaying information to a user.

In some instances, the position sensor system may include one or more switches 64 (e.g., a first switch 64a and a second switch 64b, where the switch(es) 64 may be or may include relays or other switch types such as FETs, TRIACS, etc.) having one or more switched signal paths 66 and one or more control inputs 68 (e.g., a first control input 68a and a second control input 68b), as seen in FIG. 13. Illustratively, one switch 64 may be utilized for multiple position sensors 48, or more than one switch 64 may be utilized for multiple position sensors (e.g., in a 1-1 manner or other manner), as desired. The control input 68 may set the state of the switched signal paths 66 to a first state or a second state or another state, as desired. As depicted in FIG. 13, the valve controller 26 may be coupled to the position sensor(s) 48, and may control input 68 of switch 64, where both the valve controller 26 and the position sensors 48 may be isolated from fluid communication with the fluid channel 18. In some instances, the valve controller 26 may be configured to set the state of the switched signal path 66 to the first state when the first position sensor 48a senses that a first valve port 20a is not closed or the first valve sealing member 22a is not in a closed position, and to a second state when position sensor 48 senses that a first valve port 20a is closed or the first valve sealing member 22a is in a closed position. Similarly, the valve controller 26 may be configured to set the state of the switched signal path 66 to the first state when the second sensor 48b senses that the second valve port 20b is not closed or the second valve sealing member 22b is not in a closed position, and to a second state when the position sensor 48 senses that a second valve port 20b is closed or the second valve sealing member 22b is in a closed position. In the alternative, the valve controller 26 may be configured to set the state of the switched signal path 66 to the first state when at least one of the first and second sensors valve ports 20a, 20b are not closed or at least one of the first and second valve sealing members 22a, 22b are not in a closed position, and to a second state when the position sensor 48 senses that both first and second valve ports 20a, 20b are closed or both the first and second valve sealing members 22a, 22b are in closed positions. Similar or identical or different processes, as desired, may be utilized for each position switch 64 and control input 68.

Figure 14:
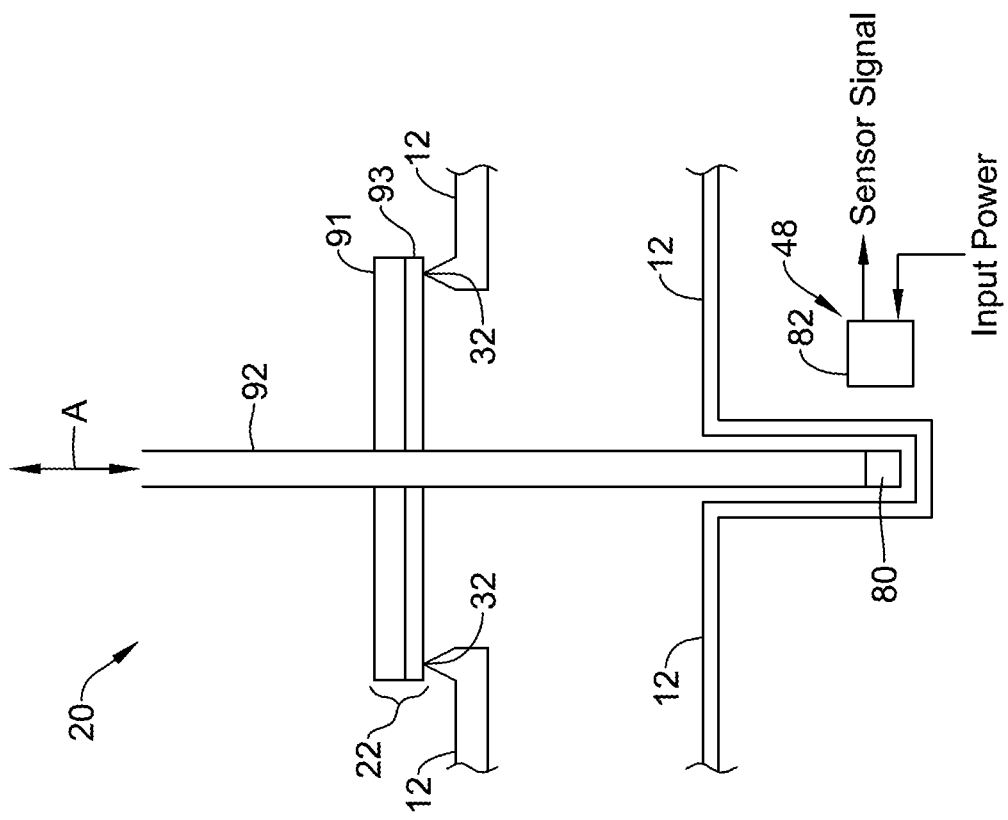
FIGS. 14-17 are various illustrative schematic depictions of different methods for sensing a position and/or state of a valve within an illustrative valve assembly.
Figure 15:
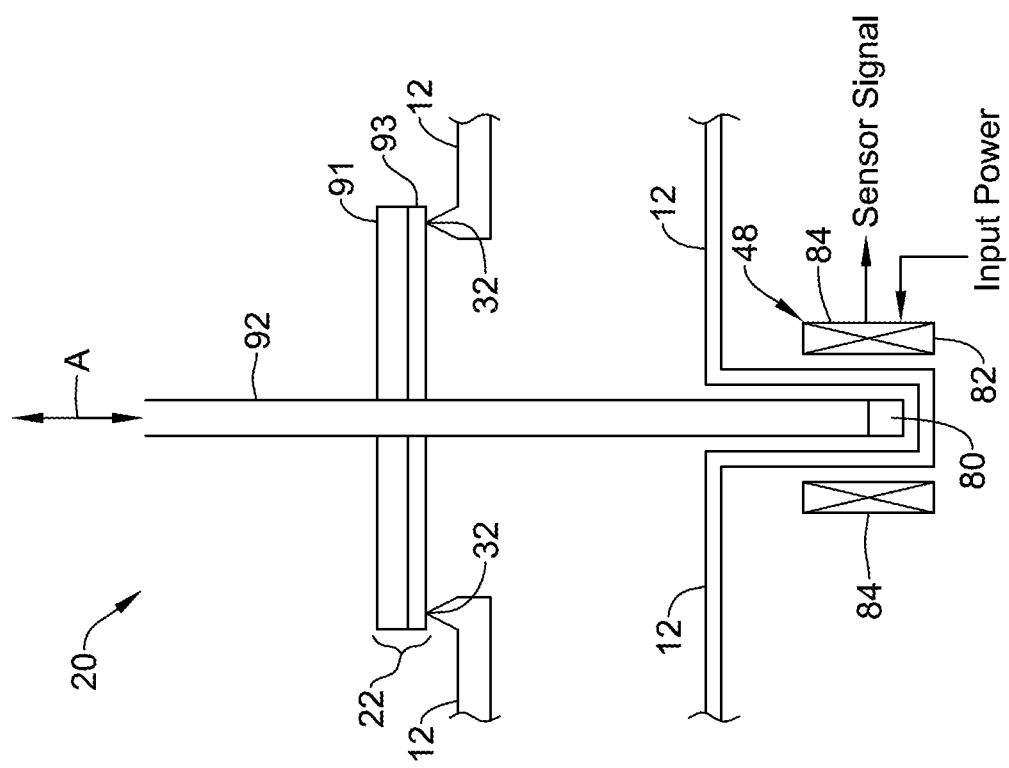

Illustratively, the valve sealing member(s) 22 may include a sensor element 80, and position sensor(s) 48 may include one or more transducer or field sensors 82. For example, valve sealing member(s) 22 may include a sensor element 80 (e.g., a magnet when using a field sensor 82, a ferrous core when using a linear variable differential transformer (LVDT) 84, or other sense element, and/or similar or dissimilar indicators) secured relative to and translatable with valve sealing member(s) 22. Position sensor(s) 48 may include one or more field sensors 82 (e.g., magnetic field sensors, a LVDT 84, Hall Effect sensors or other similar or dissimilar sensors), as seen in FIGS. 14-15. Field sensor 82 may be positioned within valve body 12 or may be positioned exterior to valve body 12 and radially spaced from a longitudinal axis of the valve port(s) 20 and/or the valve sealing member(s) 22. The position sensor(s) 48 may be positioned so as to be entirely exterior to the fluid channel 18. The meaning of entirely exterior of the fluid channel 18 may include all position sensors 48 and all electronics (e.g., wires, circuit boards) connected to the position sensor(s) 48 being exterior to fluid channel 18. Where the position sensor(s) 48 includes an LVDT, the LVDT may be positioned concentrically around and radially spaced from the valve sealing member(s) 22, as shown in FIG. 15, and/or the axis of LVDT may be spaced radially and parallel from the valve sealing members 22.

Figure 16:
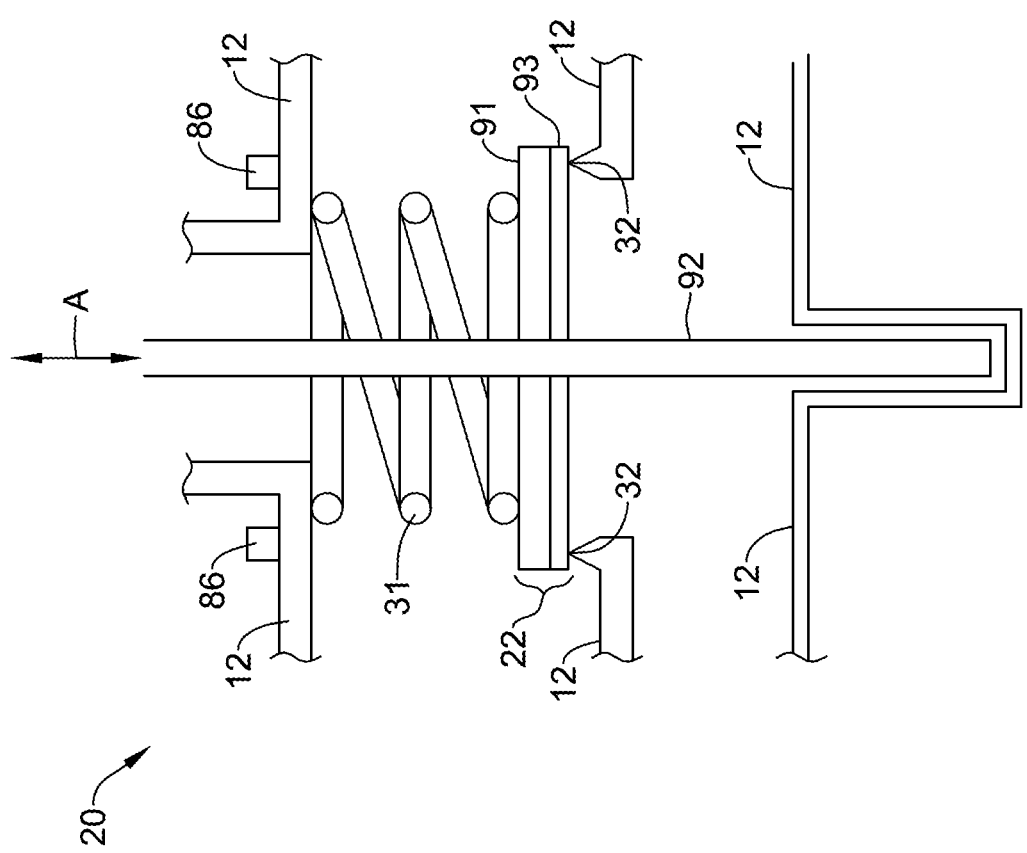
Figure 17:
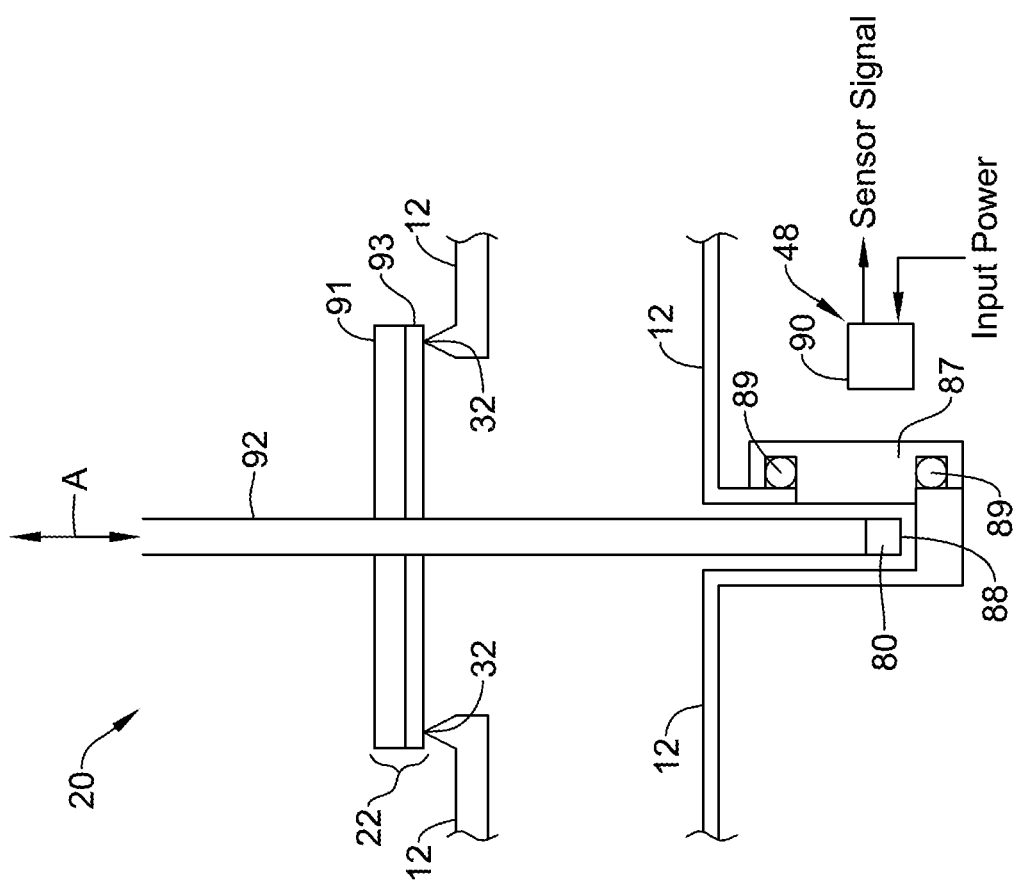

In some cases, a strain gauge 86, as depicted in FIG. 16, or other electromechanical sensor may also be utilized to sense a position of the valve sealing member 22 within an interior of the fluid channel 18 from a position fluidly exterior of the fluid channel 18 by sensing a strain level applied by the spring 31 in communication with valve sealing member 22. Alternatively, or in addition, the valve sealing member(s) 22 may include one or more visual indicators 88 (e.g., a light reflector or other visual indicators), and the position sensor(s) 48 may include one or more optical sensors 90, as seen in FIG. 17, where visual indicators may be any indicators configured to be viewed by optical sensors through a transparent window 87 sealed with an o-ring or seal 89 or through another configuration, such that optical sensors 90 may determine at least whether the valve sealing member(s) 22 is/are in a closed or open position. Where a visual position indicator 88 is utilized, and in some cases, a user may be able to visually determine when the valve sealing member(s) 22 is not in a closed position.

As may be inferred from the disclosure, the position sensor 48 may in some instances operate by detecting a position of a valve sealing member 22 and/or optionally the valve stem 92 or the like within a valve assembly 10 having a valve body 12, where the valve sealing member 22 may be translatable with respect to the valve port 20 of the valve body 12 along a translation or longitudinal axis "A" within a valve port 20. In some cases, the sensor element 80, affixed relative to the valve sealing member 22, may be positioned within the interior of the valve body 12 and may optionally fluidly communicate with the fluid channel 18; however, the position sensor 48 may be isolated from the fluid channel 18 and/or positioned exterior to the valve body 12. In an illustrative embodiment, the valve sealing member 22 may be positioned at a first position within an interior of the valve port 20 along translation axis A. The first position of the valve sealing member 22 may be sensed with position sensor 48 by sensing a location of a sensor element 80 secured relative to the valve sealing member 22 with the position sensor 48. Then, the position sensor 48 may automatically or upon request and/or continuously or discontinuously, send the sensed location and/or open or closed state of the valve sealing member 22 to the valve controller 26.

It is contemplated that the valve controller 26 may electronically calibrate the closed position of the valve sealing member 22 and/or the valve stem 92. Such a calibration may store the position of the valve sealing member 22 and/or the valve stem 92 when the valve sealing member 22 and/or the valve stem 92 is in a known closed position (e.g. such as during installation of the valve assembly 10). During subsequent operation, the position of the valve sealing member 22 and/or the valve stem 92 can be compared to the stored position to determine if the valve sealing member 22 and/or the valve stem 92 is in the closed position. A similar approach may be used to electronically calibrate other positions of the valve sealing member 22 and/or the valve stem 92 (e.g. fully open position, or some intermediate position), as desired.

As discussed, the valve controller 26 may be configured to determine one or more valve conditions and/or valve related events based on one or more diagnostic parameters related to the fluid channel 18 sensed by one or more sensor(s) (e.g., a pressure sensor, etc.) in communication with the fluid channel 18. The diagnostic parameters may be determined by the valve controller 26 and stored in the memory 37 (e.g., non-volatile memory) or other memory accessible by the valve controller 26. The diagnostic parameters may include, but are not limited to, a total number of operational cycles, a fuel usage parameter, one or more fault history parameters, one or more user or factory or other setting parameters, self-diagnostic check parameters, totalized repositioning, gas pressure, temperature pressure, leakage level detection during Valve Proving Systems, fault parameters, and/or other similar or dissimilar parameters, as desired. The communicated valve condition(s) or measure(s) related to the valve condition(s) may be determined by valve controller 26 or one or more remote devices. Illustrative valve conditions and measures related to valve conditions may include, but are not limited to: high fuel pressure conditions, low fuel pressure conditions, valve closure conditions, valve leak conditions, safety event conditions, and/or other similar or dissimilar valve conditions and/or outputs.

The valve controller 26 may determine one or more valve conditions based on one or more sensed parameters (e.g., sensed diagnostic parameters) by comparing values related to the one or more sensed parameters (e.g., values related to sensed parameters of the local sensors and/or values related to sensed parameters from one or more remotely located sensors) to threshold values. Values related to the one or more sensed parameters may include values of the sensed parameters and/or values derived, calculated, and/or determined from one or more of the values of the sensed parameters. In some illustrative instances, values related to the one or more sensed parameters may include the values resulting from mathematically processing one or more values of the one or more sensed parameters. In one example, one or more values of one or more sensed parameters may be inserted into an equation and the result of the equation after inserting the one or more values therein may be the value related to the one or more sensed parameters. Illustratively, values of one or more sensed parameter may be processed to combine outputs (e.g., values) from a plurality of sensors, to combine outputs from one or more sensors over time, to filter outputs from one or more sensors over time to reduce noise, to reduce offset error, to reduce gain error, to convert values to a different unit, and/or to process values of sensed parameters in one or more other manners.

In some cases, the memory 37 may store two or more selectable options selectable through a user interface 73 or other mechanism, where each selectable option identifies corresponding threshold values for the one or more threshold values. The threshold values stored in the memory 37 may include one or more adjustable threshold values and/or one or more fixed threshold values, where the adjustable threshold values may be adjustable by a user in the field and the fixed threshold values are not adjustable by a user in the field.

In some instances, the user interface 73 (e.g., display 52, display 62, display 76, and/or one or more other displays 77) of or in communication with the valve assembly 10, as shown in FIG. 11, may be configured to receive a selection from a user of one of the two or more selectable options stored in the memory 37 or other memory of or in communication with the valve assembly 10, and/or receive, accept, and save a threshold value related to a sensed parameter. In one example of a selection of two or more selectable options, a user may select a safety standard option from a menu and software (e.g., stored in the memory 37 or other memory in communication with the valve controller) of the valve controller 26 may identify threshold values associated with the selected selectable option that relate to the sensed parameters. Once one or more of the selectable options is/are selected and/or one or more threshold values are accepted by the user interface, the valve controller 26 may use the one or more threshold values that correspond to the selected selectable option(s) when comparing values related to the one or more sensed parameters to the one or more threshold value(s) to determine one or more valve conditions.

In some instances, each of the two or more selectable options stored in the memory 37 or other memory may correspond to a different safety standard that may be selectable by a user. Each of, or one or more of, the selectable options stored in the memory 37 or other memory may be a safety standard of a safety agency, a regional safety standard, a country safety standard, or any other safety standard.

The user interface 73 may include or may be a display with a touch screen, a key pad, selectable buttons, biometric scanners, and/or other features that facilitate two-way communication, where the display may be mechanically secured relative to the valve body 12, may be a display wired to the valve controller 26 or the microcontroller 36 of the valve controller 26, may be a mobile computing device, may be a personal computer, and/or any combination thereof. As discussed, the user interface 73 may be configured to receive a selection of selectable options (e.g., options stored in memory of the valve assembly 10 or other memory) and/or receive input from users in one or other manners. Illustratively, the user interface 73 may receive and/or accept input such as selections of selectable options; threshold values for the valve controller 26 to utilize when comparing sensed parameters to threshold values; passwords required before a user is allowed to select one or more selectable options, access data of the valve assembly, and/or enter one or more parameter related inputs; biometric information (e.g., a retina pattern of a user, a fingerprint, etc.), and/or other inputs.

Safety standards may require that settings of components in a system utilizing fuel safety shut off valves, as in some embodiments of valve assembly 10, to be protected against tampering and/or accidental change in the field. Some of the components having settings that may need to be protected from tampering and/or accidental change include, but are not limited to, proof of closure contacts, low and high gas pressure switches, valve proving switches, opening and/or closing profiles, fuel-to-air ratios, regulator output pressure sensors, cycle counters, and/or other components. Some tamper preventing mechanisms may include tamper resistant caps and/or covers, along with locks or other mechanical tools. These tamper preventing mechanisms may require special tools to perform field adjustments to the systems utilizing safety shut off valves and thus may be difficult to interact with due to space constraints, lack of lighting, and other considerations. Additionally, when mechanical tamper preventing mechanisms are used, it may be difficult to track/log changes to the system, and establishing settings for the system from a remote location may not be possible.

In some cases, all or substantially all mechanical manners of tampering resistance may be eliminated if all mechanical system adjustment mechanisms (e.g., a set screw, potentiometer, or other mechanically adjustable mechanism) are replaced by or substituted with an electronic mechanism. By utilizing a two-way user interface 73 (e.g., a user interface that accepts input and provides output), mechanical tamper preventing mechanism may be avoided. Instead, users may enter a password or provide other identity authorization (e.g., biometrics, sense element keys/tools, etc.) through the user interface 73 or other electronic access mechanisms to gain access to data and/or settings stored on or at electronics on the valve body 12.

When system settings and/or data of the system are electronically password protected or protected in any other electronic manner, a user interface 73 (e.g., a local display or a remote display) in communication with the valve assembly 10 may be utilized to enter a password and access system settings and/or data. As discussed above, illustrative user interfaces may be one or more of the display 76 on the controller, a system display 52, an appliance display 62, and/or other display 77 (e.g., a remote display, such as a mobile devices or personal computer). The user interface 73 may be in communication with the valve assembly 10 via a communication interface 110 with a wired or wireless communication link 100, and once a password is entered, system data may be accessed and/or system settings may be applied at the user interface 73.

In some instances, in addition or as an alternative to using a password, an electronic access tool or key 79 (e.g., a tool or key with an RFID tag, sense element, or other Near Field Communication (NFC) technology) or a button on the valve assembly 10 (e.g., a reset button utilized to leave a lockout mode or other button) may be utilized to access valve assembly system settings. The electronic tool or key 79 may be sensed by the valve assembly and whoever is holding or in possession of the sensed electronic tool or key 79 may be authorized to do field adjustments to the system settings and/or view data of the valve assembly 10.

In some instances, the button on the valve assembly 10 and/or the electronic access tool or key 79 may be utilized as a proximity authentication tool in combination with a password to further authenticate a user attempting to gain access to system settings and/or data of the valve assembly 10 by requiring the user to be in physical proximity to the valve assembly 10 around the time of entering a password. In one example, a user may be required to press the button on the valve assembly 10 or have the electronic access tool or key 79 adjacent the valve assembly 10 before, during, and/or after entering a password (e.g., during a time window with respect to when a password is entered). Such a utilization of a password and a proximity authentication tool may facilitate preventing unauthorized users from accessing the system settings and/or data of the valve assembly 10 if a password has been stolen, leaked and/or otherwise compromised, the communication link 100 has been hacked and/or compromised, and/or in other instances of when an unauthorized user may attempt to access the systems and/or data of the valve assembly 10.

To increase tampering resistance and/or to prevent accidental changes in settings, the valve controller 26 or other portion of the valve or appliance system may disable the ability to adjust settings and/or view data after a predetermined amount of time of inactivity after a user is logged in and/or after a predetermined amount of time after a user is logged in. In one example, the valve controller 26 may disable the ability to adjust settings and/or view valve data after one (1) minute, after two (2) minutes, after three (3) minutes or other period of inactivity of a logged in user and/or after ten (10) minutes, twenty (20) minutes, thirty (30) minutes or other period after a user last logged in. Additionally or alternatively, the valve controller 26 may disable the ability to adjust settings after a predetermined number of failed access tries (e.g., a predetermined number incorrect password entries). When an electronic access tool or key 79 is used to log into the valve controller 26 to view/change settings and/or view data, the ability to adjust settings and/or view data may be disabled when the electronic access tool or key 79 is separated from the valve assembly 10 by a predetermined distance (e.g., five (5) feet, ten (10) feet, twenty (20) feet, one hundred (100) feet, and so on).

The user interface and/or the valve assembly 10 may time stamp all access to the valve assembly 10 settings and/or data, along with recording some or all actions taken after access is granted. Such recorded time stamps and actions taken may be stored in the memory 37 (e.g., non-volatile memory or other memory) of the valve controller 26. In some instances, an administrator or administrator account may be notified of all valve assembly system changes, where the administrator or administrator account receives notification on a remote display or other user interface connected via a communication link to the valve controller 26 of the valve assembly 10.

In some instances, users using passwords and/or electronic access tools or keys 79 to access the valve controller 26 may have different levels of authorization based on profiles associated with the utilized password and/or electronic access tool or key 79. Such authorization levels may delineate which users are allowed to adjust which settings and/or view which data. For example, users at a first level may be allowed to adjust a value within a predefined set of limits and users at a second level may be allowed to adjust a value within a predetermined set of limits and may also have the authorization to modify the predetermined set limits. In some cases, a user's password indicates to the valve controller 26 for what level of access a user is authorized.

The valve controller 26 may be configured to provide a warning in response to determining that one or more sensed parameters meet and/or exceed one or more threshold values (e.g., the threshold values entered by a user, related to an option selected by a user, and/or one or more other threshold values). Additionally or alternatively, the valve controller 26 may be configured to provide a warning in response to identifying a trend identified among a plurality of sensed parameters over time (e.g., a predetermined time, a time selected by a user during a process, etc.). For example, if the valve controller 26 determines that a failure is expected to occur or that the valve will fall out of spec, the valve controller may issue a warning to the user. This warning may indicate that the valve assembly can still be safely operated but will need maintenance or replacement soon. In some cases, the valve controller 26 may predict the expected remaining life of the valve assembly, and may report the expected remaining life to the user.

In some cases, the valve controller 26 may provide a warning if it identifies two sensed parameters that each meet and/or exceed a corresponding sub-threshold value (e.g., sub-threshold values may be less than the threshold values). For example, if the current draw to actuate the valve controller is found to exceed a first sub-threshold, and a time to move the valve between the open and closed position is found to exceed a second sub-threshold, the valve controller 26 may provide a warning. This warning may indicate that the valve assembly can still be safely operated but will need maintenance or replacement soon. In some cases, two or more sensed parameters may be combined (e.g. via a function, equation or the like) to provide a combined parameter. It may be determined if the combined parameter meets and/or exceeds one or more threshold values or sub-threshold values. In one example, high temperature can often shorten electrical component and/or mechanical component life. As such, a sensed temperature over time may be integrated with the total run time of the valve assembly to provide a temperature lifetime parameter. The valve controller 26 may issue a warning if the temperature lifetime parameter meets and/or exceeds a temperature lifetime threshold value or sub-threshold value. In some cases, the valve controller 26 may predict an expected remaining life of the valve assembly based on the temperature lifetime parameter. These are just some examples.

A warning may be provided through the user interface 73 in response to receiving a warning signal (e.g., a warning signal from the microcontroller 36 of the valve controller 26). In one example of displaying a warning, the user interface may display a suggested root cause of the warning signal when displaying the warning signal, a warning light, a description of the warning, a parameter associated with the warning, a suggested fix to the issue causing a warning, steps to take in response to a warning, and/or other measures related to a warnings.

In some cases, the valve controller 26 may be configured to provide a single level warning or an escalating level of warnings in response to determining that one or more sensed parameters are approaching, meet, and/or exceed one or more of the threshold values. When the valve controller 26 is configured to provide escalating levels of warnings, a first warning signal indicating a first warning level may be provided when a sensed parameter meets and/or exceeds a first threshold value, and a second warning signal indicating a second, higher warning level may be provided when the sensed parameter meets and/or exceeds a threshold value. Additionally, or alternatively, when the valve controller 26 is configured to provide escalating levels of warnings, a first warning signal indicating a first warning level may be provided when a first sensed parameter meets and/or exceeds a threshold value, and a second warning signal indicating a second warning level may be provided when a second sensed parameter meets and/or exceeds a threshold value.

In some cases, the valve controller 26 may be configured to take one or more actions as part of or in addition to providing a warning signal when a sensed parameter value meets and/or exceeds a threshold value. In one example, the valve controller 26 may take an action by shutting down the valve assembly 10 if one or more of the sensed parameters meet and/or exceed one or more of the fixed thresholds (e.g., a threshold set by a safety standard or regulation or a threshold set in a different manner). Additionally or alternatively, the action the valve controller 26 may be to allow the valve assembly 10 to continue to operate but issue an alert or a particular level of warning if one or more sensed parameter meets and/or exceeds one or more of the adjustable thresholds (e.g., a threshold set by a user as an indication a parameter may be approaching a fixed threshold or a threshold set in a different manner).

In an illustrative method of operating the valve assembly 10, the valve assembly may receive at the user interface 73 input relating to a selection and/or entering of one or more safety standards saved in the memory (e.g., memory 37) of the valve assembly 10, where each of the safety standards includes one or more threshold values related to parameters sensed the by local and/or remote sensors. With the local and/or remote sensors, one or more parameters may be sensed and values of those sensed parameters may be obtained and transferred to the valve controller 26 of the valve assembly 10. The valve controller 26 may be utilized to determine one or more valve conditions and/or valve events based on the one or more sensed parameters and the one or more thresholds designated by the selected and/or entered safety standard. An indication of the determined one or more valve conditions may be displayed on the user interface 73 (e.g., one or more of display 52, display 62, display 76, and display 77).

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A valve assembly comprising:
a valve body having an inlet port and an outlet port, with a fluid path extending between the inlet port and the outlet port;
a valve situated in the fluid path between the inlet port and the outlet port;
a valve actuator, secured relative to the valve body, for selectively moving the valve between a closed position, which closes the fluid path between the inlet port and the outlet port, and an open position;
one or more local sensors for sensing one or more local parameters of the valve, the valve actuator, and/or within the valve body;
one or more remote sensor inputs for receiving one or more remote parameters from one or more remotely located sensors, wherein the one or more remotely located sensors are outside of and not integral with the valve body, the valve and the valve actuator, and the one or more remote parameters are not sensed in the fluid path of the valve body upstream or downstream of the valve, wherein the one or more remotely located sensors includes one or more of a current sensor, a gas sensor, an oxygen sensor, a CO sensor, and a $CO_2$ sensor;
a controller secured relative to the valve body and in communication with the plurality of local sensors and the one or more remote sensor inputs, the controller configured to determine one or more valve conditions based, at least in part, on a comparison of two or more values related to one or more of the local parameters from one or more of the local sensors and/or one or more of the remote parameters from the one or more of the remotely located sensors with corresponding ones of two or more threshold values;
a memory secured relative to the valve body and operatively coupled to the controller, the memory storing two or more selectable options, wherein each selectable option identifies corresponding threshold values for the two or more threshold values, wherein one or more of the threshold values is an adjustable threshold value that is adjustable by a user in the field, and one or more of the threshold values is a fixed threshold value that is not adjustable by a user in the field; and
a user interface configured to receive a selection from a user of one of the two or more selectable options stored in the memory, wherein once selected, the controller is configured to use the two or more threshold values that correspond to the selected selectable option when comparing values related to the one or more local parameters from one or more of the local sensors and/or one or more remote parameters from the one or more of the remotely located sensors.

2. The valve assembly of claim 1, wherein the controller is configured to determine one or more of the valve conditions based, at least in part, on a comparison of one or more values related to one or more of the local parameters from the one or more local sensors and one or more of the threshold values.

3. The valve assembly of claim 1, wherein the user interface is further configured to receive the selection from the user of one of the two or more selectable options, and to provide an indicator related to the one or more determined valve conditions to the user.

4. The valve assembly of claim 1, wherein the one or more local sensors include one or more of a pressure sensor, a flow sensor, a temperature sensor, a position sensor, and a current sensor.

5. The valve assembly of claim 1, wherein the one or more remotely located sensors include one or more of a pressure sensor, a flow sensor, a temperature sensor and a position sensor.

6. The valve assembly of claim 1, wherein the controller is configured to identify one or more trends in one or more remote parameters over a predetermined time.

7. The valve assembly of claim 6, wherein the controller is configured to identify a correlation between trends in two or more remote parameters.

8. A valve assembly system comprising:
   a valve assembly comprising:
      a valve body having an inlet port and an outlet port, with a fluid path extending between the inlet port and the outlet port;
      a valve situated in the fluid path between the inlet port and the outlet port;
      a valve actuator, secured relative to the valve body, for selectively moving the valve between a closed position, which closes the fluid path between the inlet port and the outlet port, and an open position;
      one or more sensors in communication with the fluid path for sensing one or more sensed parameters within the fluid path of the valve body;
      a controller secured relative to the valve body and in communication with the one or more sensors, the controller determining one or more valve conditions based at least in part on the one or more sensed parameters by comparing values related to the one or more sensed parameters to corresponding ones of two or more threshold values;
      a memory secured relative to the valve body and operatively coupled to the controller, the memory storing two or more selectable options, wherein each selectable option identifies corresponding threshold values for the two or more threshold values, wherein one or more of the threshold values is an adjustable threshold value that is adjustable by a user in the field, and one or more of the threshold values is a fixed threshold value that is not adjustable by a user in the field; and
   a user interface configured to receive a selection from a user of one of the two or more selectable options stored in the memory, wherein once selected, the controller is configured to use the two or more threshold values that correspond to the selected selectable option when comparing values related to the one or more sensed parameters.

9. The valve assembly system of claim 8, further comprising an electronic access mechanism configured to restrict access to the selection of one of the two or more selectable options stored in the memory.

10. The valve assembly of claim 9, wherein the electronic access mechanism includes a password protection system and the user interface is configured to receive a password prior to allowing the selection from a user of the one of the two or more selectable options stored in the memory.

11. The valve assembly of claim 9, wherein the electronic access mechanism includes a button on the valve assembly for selection to ensure user proximity to the valve assembly.

12. The valve assembly of claim 9, wherein the electronic access mechanism includes a sense element configured to be sensed by the valve assembly.

13. The valve assembly system of claim 8, wherein the controller is configured to provide an alert in response to determining that one or more sensed parameters goes beyond one of the adjustable threshold values.

14. The valve assembly system of claim 8, wherein the controller is configured to shut down the valve in the closed position in response to determining that one or more of the sensed parameters goes beyond a corresponding one of the one or more fixed threshold values.

15. The valve assembly system of claim 8, wherein the controller is configured to:
   provide an alert in response to determining that one or more sensed parameters goes beyond one of the adjustable threshold values; and
   shut down the valve, in the closed position, in response to determining that one or more of the sensed parameters goes beyond a corresponding one of the one or more fixed threshold values.

16. The valve assembly system of claim 8, wherein the controller is configured to:
   issue a first alert when a value related to a first sensed parameter goes beyond a first adjustable threshold value; and
   issuing a second alert when a value related to a second sensed parameter goes beyond a second adjustable threshold value.

17. The valve assembly system of claim 8, wherein the valve assembly further comprises one or more sensors inputs for receiving one or more remote parameters from one or more remotely located sensors, wherein the one or more remotely located sensors are outside of and not integral with the valve body, the valve and the valve actuator, and the one or more remote parameters are not sensed in the fluid path of the valve body upstream or downstream of the valve.

18. A method of operating a valve assembly comprising:
   receiving input related to a selection of one or more safety standards via a user interface, wherein each safety standard designates two or more threshold values, wherein one or more of the threshold values is an adjustable threshold value that is adjustable by a user in the field, and one or more of the threshold values is a fixed threshold value that is not adjustable by a user in the field;
   sensing one or more sensed parameters of the valve assembly;
   transferring values of the one or more sensed parameters to a controller of the valve assembly;
   using the controller of the valve assembly to determine one or more valve conditions based on the one or more sensed parameters and the two or more threshold values designated by the selected safety standard;
   displaying an indication of the one or more valve conditions on a user interface;
   shutting down the valve assembly if a value related to one or more of the sensed parameters goes beyond a corresponding one of the one or more fixed threshold values; and
   allowing the valve assembly to operate but issuing an alert if a value related to one or more sensed parameters goes beyond a corresponding one of the one or more adjustable threshold values.

19. The method of claim 18, further comprising:
   issuing a first alert when a value related to a first sensed parameter goes beyond a first adjustable threshold value; and issuing a second alert when a value related to a second sensed parameter goes beyond a second adjustable threshold value.

20. The method of claim 19, wherein the value related to the first sensed parameter is sensed by a local sensor sensing one or more local parameters within the valve assembly; and the value related to the second sensed parameter is sensed by a remote sensor sensing one or more remote parameters outside of the valve assembly.

* * * * *